(12) United States Patent
Thust et al.

(10) Patent No.: US 12,122,140 B2
(45) Date of Patent: Oct. 22, 2024

(54) LED LIGHTING UNIT WITH MULTI-LAYER BODIES HAVING A CARRIER LAYER, A STONE LAYER, AND AN EDGELIT TRANSPARENT LAYER

(71) Applicant: Covestro Intellectual Property GmbH & Co. KG, Leverkusen (DE)

(72) Inventors: Torsten Thust, Wermelskirchen (DE); Thorsten Schulz, Leverkusen (DE); Rainer Hagen, Leverkusen (DE); Ciro Piermatteo, Leverkusen (DE); Marius Rogowski, Frechen (DE); Armin Berger, Langenfeld (DE); Jan Helmig, Dormagen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 276 days.

(21) Appl. No.: 17/642,999

(22) PCT Filed: Sep. 21, 2020

(86) PCT No.: PCT/EP2020/076247
§ 371 (c)(1),
(2) Date: Mar. 15, 2022

(87) PCT Pub. No.: WO2021/063719
PCT Pub. Date: Apr. 8, 2021

(65) Prior Publication Data
US 2022/0332089 A1    Oct. 20, 2022

(30) Foreign Application Priority Data

Sep. 30, 2019   (EP) .................................... 19200453
Apr. 8, 2020    (DE) ..................... 20 2020 101 945.7

(51) Int. Cl.
*B32B 9/04*         (2006.01)
*B32B 1/00*         (2006.01)
(Continued)

(52) U.S. Cl.
CPC ................ *B32B 9/045* (2013.01); *B32B 1/00* (2013.01); *B32B 7/023* (2019.01); *B32B 9/002* (2013.01);
(Continued)

(58) Field of Classification Search
CPC ........ B32B 2307/412; B32B 2307/414; B32B 2419/04; F21V 33/00; F21V 33/006; G02B 6/0095
See application file for complete search history.

(56) References Cited

U.S. PATENT DOCUMENTS 2,587,855 A * 3/1952 Johnson .................. F21S 8/022
                                                 62/235
2,991,273 A   7/1961 Hechelhammer et al.
(Continued)

FOREIGN PATENT DOCUMENTS

DE    2063050 A    7/1972
DE    3832396 A    2/1990
(Continued)

OTHER PUBLICATIONS

D. Freitag, U. Grigo, P. R. Müller, H. Nouvertné, Bayer AG, "Polycarbonates" in Encyclopedia of Polymer Science and Engineering, vol. 11, Second Edition, 1988, pp. 648-718.
(Continued)

*Primary Examiner* — Ismael Negron
(74) *Attorney, Agent, or Firm* — John E. Mrozinski, Jr.

(57) ABSTRACT

A lighting unit which includes a multilayer body and at least a first light emitting diode (LED) light source. The multilayer body includes, in sequence, a carrier layer of a black
(Continued)

or gray translucent thermoplastic composition, a stone layer with an average thickness of 2 mm of less, and a transparent thermoplastic layer with an average thickness of 1 mm to 6 mm. The LED light source is disposed facing at least one lateral edge of the transparent thermoplastic layer, such that light from the LED light source is guided within the transparent thermoplastic layer.

18 Claims, 1 Drawing Sheet

(51) Int. Cl.
| | |
|---|---|
| B32B 7/023 | (2019.01) |
| B32B 9/00 | (2006.01) |
| B32B 27/20 | (2006.01) |
| B32B 27/36 | (2006.01) |
| F21V 8/00 | (2006.01) |
| F21V 33/00 | (2006.01) |
| F21Y 113/17 | (2016.01) |
| F21Y 115/10 | (2016.01) |

(52) U.S. Cl.
CPC ............ *B32B 27/20* (2013.01); *B32B 27/365* (2013.01); *F21V 33/00* (2013.01); *G02B 6/0051* (2013.01); *G02B 6/0065* (2013.01); *B32B 2255/10* (2013.01); *B32B 2255/26* (2013.01); *B32B 2255/28* (2013.01); *B32B 2264/02* (2013.01); *B32B 2264/108* (2013.01); *B32B 2264/12* (2013.01); *B32B 2307/3065* (2013.01); *B32B 2307/4026* (2013.01); *B32B 2307/412* (2013.01); *B32B 2307/414* (2013.01); *B32B 2307/538* (2013.01); *B32B 2307/732* (2013.01); *B32B 2419/04* (2013.01); *B32B 2457/00* (2013.01); *B32B 2479/00* (2013.01); *B32B 2509/00* (2013.01); *B32B 2605/003* (2013.01); *B32B 2607/02* (2013.01); *F21Y 2113/17* (2016.08); *F21Y 2115/10* (2016.08)

(56) References Cited

U.S. PATENT DOCUMENTS

| | | | |
|---|---|---|---|
| 2,999,835 A | 9/1961 | Goldberg | |
| 2,999,846 A | 9/1961 | Schnell et al. | |
| 3,148,172 A | 9/1964 | Fox | |
| 3,271,367 A | 9/1966 | Schnell et al. | |
| 4,101,513 A | 7/1978 | Fox et al. | |
| 4,395,463 A | 7/1983 | Kray | |
| 4,982,014 A | 1/1991 | Freitag et al. | |
| 5,041,313 A | 8/1991 | Patel | |
| 5,288,778 A | 2/1994 | Schmitter et al. | |
| 5,391,795 A | 2/1995 | Pickett | |
| 5,821,380 A | 10/1998 | Holderbaum et al. | |
| 5,869,185 A | 2/1999 | Bahr et al. | |
| 5,883,165 A | 3/1999 | Kroehnke et al. | |
| 6,116,751 A * | 9/2000 | Remp | F21V 21/0824 |
| | | | 362/153.1 |
| 6,350,512 B1 | 2/2002 | Hurley et al. | |
| 6,732,478 B1 * | 5/2004 | Russell | E04F 15/02423 |
| | | | 52/657 |
| 7,014,726 B2 | 3/2006 | Whiting | |
| 7,332,105 B2 | 2/2008 | Braig et al. | |
| 7,442,430 B2 | 10/2008 | Buckel et al. | |
| 7,549,784 B1 * | 6/2009 | Teeters | F21V 23/06 |
| | | | 362/147 |
| 7,857,905 B2 | 12/2010 | Hayes | |
| 9,476,551 B2 * | 10/2016 | Thijssen | F21S 8/00 |
| 9,689,169 B2 * | 6/2017 | Nelson | F21V 33/006 |
| 9,920,921 B2 * | 3/2018 | Furmanek | F21V 33/006 |
| 10,067,285 B1 * | 9/2018 | Zheng | G02B 6/0091 |
| 11,359,804 B2 * | 6/2022 | Yang | G09F 19/228 |
| 11,598,495 B2 | 3/2023 | Piermatteo et al. | |
| 2007/0154705 A1 * | 7/2007 | Doeppner | B32B 17/10761 |
| | | | 156/99 |
| 2009/0318578 A1 | 12/2009 | Versteeg et al. | |
| 2012/0065050 A1 * | 3/2012 | Nieminen | B44C 5/0407 |
| | | | 501/32 |
| 2020/0173616 A1 | 6/2020 | Piermatteo et al. | |
| 2022/0332088 A1 * | 10/2022 | Thust | B32B 7/023 |

FOREIGN PATENT DOCUMENTS

| | | | |
|---|---|---|---|
| DE | 102005038022 A1 | 2/2007 | |
| EP | 0570165 A2 | 11/1993 | |
| GB | 1122003 A | 7/1968 | |
| GB | 1229482 A | 4/1971 | |
| GB | 1367788 A | 9/1974 | |
| GB | 1367790 A | 9/1974 | |
| JP | 2002205500 A | 7/2002 | |
| WO | 2000068530 A1 | 11/2000 | |
| WO | 2009110870 A1 | 9/2009 | |
| WO | WO-2017069497 A1 * | 4/2017 | ............... E04C 2/54 |

OTHER PUBLICATIONS

U. Grigo, K. Kirchner and P. R. Müller "Polycarbonate" [Polycarbonates] in Becker/Braun, Kunststoff-Handbuch [Plastics Handbook], vol. 3/1, Polycarbonate, Polyacetale, Polyester, Celluloseester [Polycarbonates, Polyacetals, Polyesters, Cellulose Esters], Carl Hanser Verlag Munich, Vienna 1992, pp. 117-299.
H. Schnell, Chemistry and Physics of Polycarbonates, Interscience Publishers, New York 1964, p. 28 ff.; p. 102 ff.
D.G. Legrand, J.T. Bendler, Handbook of Polycarbonate Science and Technology, Marcel Dekker New York 2000, p. 72ff.
Ullmann's Encyclopedia of Industrial Chemistry, 5th Edition, vol. A18, pp. 368-426, VCH, Weinheim 1991.
International Search Report, PCT/EP2020/076247, date of mailing: Nov. 17, 2020, Authorized officer: René Nowak.

* cited by examiner

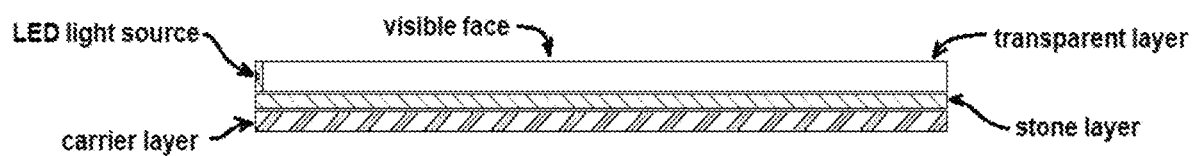

LED LIGHTING UNIT WITH MULTI-LAYER BODIES HAVING A CARRIER LAYER, A STONE LAYER, AND AN EDGELIT TRANSPARENT LAYER

CROSS REFERENCE TO RELATED APPLICATIONS

This application is a national stage application under 35 U.S.C. § 371 of PCT/EP2020/076247, filed Sep. 21, 2020, which claims benefit of German Application No. 20 2020 101 945.7, filed Apr. 8, 2020, and European Application No. 19200453.9, filed Sep. 30, 2019, all of which are incorporated herein by reference in their entireties.

FIELD OF THE INVENTION

The invention relates to an illuminable multilayer body with a carrier layer consisting of a thermoplastic material and a stone layer, having a stone look.

BACKGROUND OF THE INVENTION

In the field of interior architecture of buildings and also of automotive interior, there is a drive to endow surfaces with a natural look. The impression of wood and stone in particular creates an atmosphere of comfort, closeness to nature and upscale modernity. Stone is of interest as a surface since the weight and bulk emanating from this material suggests luxury. Granite elements, if chosen, for example, as washbasin mount, kitchen worktop or floor or wall cladding, are indeed a luxury element on account of the costs of the material. At the same time, they complicate installation because of their own high weight. There is a need for configuration elements with a stone look. In order to reduce the weight of corresponding elements, there has been past development of elements where, rather than a solid stone element, a multilayer body is used, in which the thickness of the stone layer is reduced and a carrier layer is provided for stabilization instead.

DE 102005038022 A1, for example, discloses a composite material having a pliable carrier layer made of plastic, bonded to a transparent natural stone layer without adhesive layer. The use of the composite material as cladding element, especially for wall and facade cladding, is disclosed.

German utility model describes a flexible two-dimensional material having a natural stone surface, which, as well as a stoneware, has a flexible carrier layer, wherein the two-dimensional material has been provided with an adhesive layer for securing on a base, since the intention is to use the two-dimensional material as floor covering, but also as cladding element for wall surfaces, furniture etc. for creation of decorative stone surfaces having a solid look.

WO 2000/068530 A1 also describes a multilayer shaped body having a colored carrier layer and a thin natural stone layer which is visible at the surface and is notable for a particular color intensity, imparted by the color of the carrier layer. The shaped body is preferably pliable, with a resolved grain microstructure of the natural stone layer. The shaped body has a transparent outer layer that imparts a homogeneous, smooth and possibly also shiny appearance to the shaped body in spite of the resolution of the grain microstructure of the stone layer. Possible uses mentioned are especially wall panels, for the exterior and interior, and car dashboards.

WO 2004/052561 A1 describes a process for producing a multilayer body having a stone layer, in which polymer is applied to a stone element which then binds to the surface and is pulled away from the stone element together with a layer of stone. A seal may be provided on the visible face of the multilayer body. Compared to a solid stone plaque of the same thickness, the multilayer body has a distinctly reduced weight. The utility of the multilayer bodies for floor coverings and wall panels is described.

Likewise an essential aspect in interior configuration, both in the case of automobiles and in the architecture sector, is endowment with light. As well as conventional lamps, including those of complex design, lighting elements are integrated inconspicuously into the areas of wall, cupboard or floor.

On account of their long lifetime, low energy consumption and good light yield, LED light sources are finding increasing use, for example in the automotive industry, aviation, interior lighting, facade configuration etc. LEDs emit light having a wavelength dependent on the semiconductor material and doping, and LEDs may therefore be used to produce virtually monochromatic light, even in the infrared range or UV range.

There are RGB-LEDs which emit red, green or blue light. For white LED light, light of different wavelengths has to be combined. This is typically achieved by combination of a blue-emitting, a red-emitting and a green-emitting LED to give what are called RGB (red-green-blue) modules, the combined light from which can be perceived as white, or by luminescence techniques in which all or some of the LED radiation is converted by means of phosphors, for example, to different wavelengths.

For instance, white light can be created proceeding from an LED that emits in the blue in the visible region, by addition of a single phosphor that converts some of the radiation in the blue region into red/yellow light. This form of creation of white light is preferred for commercial applications for reasons of cost and owing to the high efficiency of blue LEDs.

Alternatively, it is possible to create white light from UV light created with LEDs with the aid of three different phosphors that emit wavelengths corresponding to an RGB module. If this technique is employed, preference is given to compositions which also have elevated stability to UV radiation, i.e. have been provided with UV stabilization for example.

To establish an overall color impression deviating from "white" in the LED modules, the above light sources may also be further modified as required. This modifying may be effected for example by:
  combining with a phosphorescent dye or
  combining with additional light sources having different emissions characteristics.

The prior art already discloses combining the stone look with a light element. For instance, WO 2009/110870 A1 describes a veneer composed of a stone layer of thickness 0.3 to 1.5 mm that is still transparent on a transparent, translucent or opaque carrier layer consisting of a glass, a polycarbonate or another suitable material, where the element can be sent to a multitude of uses; lighting from the reverse side is one option mentioned.

However, there is still a need for alternative decorative or functional elements with a stone look, having a very pleasing day/night design and having a minimum intrinsic weight taking account of the suggested high quality of the surface. The element with stone look in daytime design should look like true thick stone with a maximum degree of bulk, but at the same time enable high variability of the light effects and personalizability for nighttime design. The problem addressed was thus that of providing a corresponding element.

BRIEF DESCRIPTION OF THE DRAWING

FIG. 1 is a side section of the instant lighting unit.

DETAILED DESCRIPTION OF THE INVENTION

The problem is solved in accordance with the invention by an LED lighting unit comprising
a) a multilayer body and
b) a first LED light source,
wherein the multilayer body comprises the following layers in this sequence:
   a1) a carrier layer of a translucent black or translucent gray thermoplastic composition,
   a2) a stone layer having an average thickness over the total area of the stone layer of ≤2 mm,
   a3) a transparent layer of a thermoplastic composition having an average thickness over the total area of 1 to 6 mm, on the face of the stone layer a2 that constitutes the visible face of the multilayer body in the LED lighting unit,
wherein the first LED light source is disposed at at least one lateral edge of the transparent layer a3 such that the transparent layer a3 is utilizable as for light emitted by the LED light source.

By virtue of the translucent dark, i.e. translucent black or translucent gray, carrier layer, the multilayer body, in spite of the very low thickness of the stone layer, even in the case of thicknesses of 0.05 mm to ≤0.3 mm, looks as if it has a much thicker, very bulky stone layer. The multilayer body has a particularly high-quality appearance when the carrier material used is translucent black material. Such materials are described in WO 2019/020478 A1, the content of which with regard to suitable compositions with corresponding color effect, including the detailed description of the individual components and of the embodiments specified as preferred, and of the examples that demonstrate enablement, shall be incorporated into the present disclosure.

The LED lighting unit preferably also has a second light source arranged in such a way that it serves as backlighting for the multilayer body, i.e. can shine through the multilayer body from behind. In the case of backlighting, the LED light source is behind the carrier layer, such that the translucent carrier layer, the stone layer and the transparent layer are backlit.

The fact that the transparent layer a3 is utilizable as light guide for the light emitted by the LED light source does not mean that edge lighting has to be uninterrupted in the state of operation. Instead, this is one technically defined option that the user can choose. The edge lighting may of course also be switched off, as will generally be the case particularly in daylight. It will be apparent that corresponding control of the light source is also possible using sensor technology or timeswitch technology. If additional backlighting is provided, this can be chosen as an alternative to backlighting or can be switched on simultaneously therewith. The LED lighting unit may also be utilized when both backlighting and edge lighting are switched off.

By virtue of the light, the edge lighting, but also the backlighting from behind, the structure of the invention, as well as pleasing daytime design, has a high-quality nighttime design that can be modified further by choice of the color of the LED light.

"LED lighting unit" is used here not only in the narrow sense of a package of mechanically joined individual parts but also more broadly as a mere combination of individual parts (merely) joined in a functional sense to form a unit. However, a mechanically joined combination may likewise be concerned. According to the invention, "LED lighting unit" is understood to mean any device or any system that has a multilayer body functionally associated with an LED light source in the manner of the invention. This may comprise elements for formation of floor coverings or for furniture making, wall or door panels, parts of lamps and lighting elements, a housing of domestic appliances or electrical equipment, or components from the automotive sector, especially from the field of automotive interior configuration, such as parts of interior trim, parts of dashboards, parts of instrument panels, decorative strips, doorsill strips, parts of armrests, parts of center consoles.

The LED lighting units of the invention have a pleasing day/night design. Without the LED light source switched on, the viewer sees a pleasing natural stone look. With the first LED light source switched on, the result is a distinctly different appearance since the edge lighting of the transparent component produces a 3-dimensional topography of the stone layer, additionally with sparkling or mirror elements depending on the type of stone used. Furthermore, edge lighting is also combinable with backlighting to give further light effects. A particular design aspect is imparted to the LED lighting unit of the invention by the translucent dark layer. Not only in that this imparts a particularly solid appearance to the daytime design, but also in that the material is capable of transmitting colored light in spite of its dark color. Thus, if colored LEDs are used as light source, for example red, green or blue, for instance in the form of RGB LEDs, the diodes of which can be driven individually, appropriately colored light also passes through the multilayer body. For example, the multilayer body in nighttime design with red LED(s) switched on as backlighting, shines red with noticeable patterning by the stone layer.

"Multilayer body" in the context of the invention is any structure composed of multiple layers comprising at least layers a1, a2 and a3. It will be apparent that further layers, for instance on the outside of the multilayer body, may be provided on one or two flat sides of the multilayer body, especially a scratch-resistant layer. "On the outside of the multilayer body" here means the opposite face of the carrier layer a1 or of the transparent layer a3 from the layer adjoining the stone layer a2.

The multilayer body has the form of a sheet, or a geometry other than a sheet. A sheet is the customary form in the case of wall elements, tile elements, or elements for floor coverings. LED lighting elements having a geometry other than a sheet, having a three-dimensionally shaped visible surface, by contrast, are preferably used in the case of automotive interior applications, for instance a car dashboard. Three-dimensionally shaped parts many manufactured either directly by injection molding, for example by the production process elucidated in the examples, with three-dimensionally processed stone plaques, or by a subsequent process of thermoforming a multilayer body in sheet form.

What is meant in the context of the invention by "transparent" is a transmittance Ty, measured at a thickness of 2 mm to ISO 13468-2:2006 of at least 85%, preferably of at least 86%, more preferably of at least 88%, and preferably a haze of less than 2.0%, further preferably of less than 1% to 5%, even further preferably of less than 1.0%, especially preferably of less than 0.8%, determined to ASTM D1003: 2013 at a layer thickness of 2 mm.

In the context of the present invention, an "LED light source" is understood to mean a light source that emits light having radiation characteristics where more than 70% of the intensity emitted in the range from 200 nm to 3000 nm is in the visible range of the spectrum. In the context of the present invention, the visible range is defined as the wavelength range from 360 nm to 780 nm. It is especially preferable when less than 5% of the intensity is in the range <360 nm. Considering the range from 360 nm to 500 nm, the LED light in the context of the present invention has a peak wavelength in terms of its intensity—i.e. wavelength of maximum intensity—of 360 nm to 460 nm, further preferably of 400 nm to 460 nm, and especially preferably of 430 nm to 460 nm, or alternatively especially preferably of 400 nm to 405 nm. To determine the peak wavelength, a radiation-equivalent parameter, for example radiation flux, is measured with spectral resolution and plotted in a Cartesian coordinate system. On the y axis is plotted the radiation-equivalent parameter, and on the x axis the wavelengths. The absolute maximum of this curve is the "peak wavelength" (definition according to DIN 5031-1 (1982)). The term "from . . . to" includes the specified threshold values. The "LED light" here preferably has a narrow emission width with a full width at half maximum of not more than 60 nm, more preferably of not more than 45 nm, even more preferably of not more than 30 nm, with particular preference being given to monochromatic light. The full width at half maximum here is the full width of the emission peak at half intensity. According to the invention, in principle, all above-described LED/LED techniques may be used separately or together.

Utilization "as a light guide" means that at least some of the light emitted by the LED light source is transported through the transparent layer a3 by internal reflection. Preferably at least some of the light emitted by the LED light source is totally reflected at the interfaces of the transparent layer a3 with the stone layer a2 and/or of the transparent layer a3 with the ambient air or a further additional transparent layer on the outside of the multilayer body. "Interface" here is the surface at which and/or by which two or more layers of the multilayer body or the ambient air are joined to one another, or directly adjoin one another. Interfaces are formed by material transitions.

Edge lighting is a comparatively energy-efficient means of generating pleasing lighting effects since comparatively few LEDs are required.

The carrier layer a1 is a layer of a translucent black or a translucent gray thermoplastic composition. What is meant by "of" is that the carrier layer consists of the composition.

"Translucent" molding compounds in the context of the present invention are understood to mean those having transmittance Ty, measured at a thickness of 2 mm to ISO 13468-2:2006 (D65, 10°), of <40% and at least 2.5%, preferably >2.5%, further preferably <25% and >2.7%, especially preferably <20% and >2.9%, and preferably haze, measured to ASTM D1003:2013 at a layer thickness of 2 mm, of >95%, more preferably >99%.

According to the present invention, black compositions are understood to mean compositions described by the CIELab color coordinates L* less than 40, a* less than 15 and more than-15, preferably less than 10 and more than-10, and b* less than 15 or more than-15, preferably less than 10 and more than-10, determined at a thickness of 2 mm to ISO 13468-2:2006 (D65, 10°). According to the present invention, gray compositions are understood to mean compositions described by the CIELab color coordinates L* of at least 40 and less than 65, a* less than 15 and more than-15, preferably less than 10 and more than-10, and b* less than 15 or more than-15, preferably less than 10 and more than-10, determined at a thickness of 2 mm to ISO 13468-2:2006 (D65, 10°).

The thermoplastic composition is based on a thermoplastic polymer which is preferably present in thermoplastic composition in a proportion of at least 50% by weight, further preferably at least 60% by weight, even further preferably at least 75% by weight, more preferably at least 85% by weight, most preferably at least 90% by weight.

Suitable thermoplastic polymers are, for example, aromatic polycarbonate (PC), polyestercarbonate, polystyrene (PS), styrene copolymers, a polyalkylene such as polyethylene (PE) or polypropylene (PP), an aromatic polyester such as polyethylene terephthalate (PET) or polybutylene terephthalate (PBT), PET-cyclohexanedimethanol copolymer (PETG), polyethylene naphthalate (PEN), a poly- or copolymethylmethacrylate such as polymethylmethacrylate (PMMA), a polyimide (for example PMMI), a polyethersulfone, a thermoplastic polyurethane, a cyclic olefin polymer or copolymer (COP or COC) or mixtures thereof, preferably aromatic polycarbonate, aromatic polyester, cyclic olefin polymer, including olefin copolymer, or polymethylmethacrylate, or mixtures of these.

If a mixture of different polymers is used, this is preferably a mixture of aromatic polycarbonate with PMMA or a polyester.

More preferably, the polymer present in the thermoplastic composition from which the carrier layer is formed is aromatic polycarbonate, alone or in a mixture with another polymer, especially a polyester.

More preferably, the thermoplastic composition of the carrier layer contains solely aromatic polycarbonate as thermoplastic polymer. Aromatic polycarbonates in the context of the invention are all known aromatic polycarbonates. This includes homopolycarbonates and copolycarbonates. Where reference is made merely to "polycarbonate" anywhere in the context of the present invention, what are meant are especially aromatic polycarbonates. The aromatic polycarbonate in a thermoplastic composition in one of the layers of the multilayer body is a particular aromatic polycarbonate or a mixture of different aromatic polycarbonates, i.e., for example, two different aromatic copolycarbonates or two different aromatic homopolycarbonates or one aromatic homopolycarbonate and one aromatic copolycarbonate.

A portion of up to 80 mol %, preferably of 20 mol % to 50 mol %, of the carbonate groups in the polycarbonates used in accordance with the invention may be replaced by aromatic dicarboxylic ester groups. Polycarbonates of this type that incorporate not only acid radicals derived from carbonic acid but also acid radicals derived from aromatic dicarboxylic acids in the molecular chain are referred to as aromatic polyester carbonates. In the context of the present invention, they are likewise covered by the umbrella term of thermoplastic aromatic polycarbonates.

The polycarbonates are prepared in a known manner from dihydroxyaryl compounds, carbonic acid derivatives, and optionally chain terminators and branching agents.

Details of the production of polycarbonates have been set out in many patent specifications during the last 40 years or so. Reference may be made here, by way of example, to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouverné, BAYER AG, "Polycarbonates" in Encyclopedia of Polymer Science and Engineering, Volume 11, Second Edition, 1988, pages 648-718 and finally to Dres. U. Grigo, K. Kirchner and P. R. Midler "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299.

Dihydroxyaryl compounds suitable for the preparation of polycarbonates are, for example, hydroquinone, resorcinol, dihydroxydiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, alpha-alpha'-bis(hydroxyphenyl)diisopropylbenzenes, phthalimidines derived from derivatives of isatin or phenolphthalein and the ring-alkylated, ring-arylated and ring-halogenated compounds thereof.

Preferred dihydroxyaryl compounds are 4,4'-dihydroxydiphenyl, 2,2-bis (4-hydroxyphenyl) propane, 2,4-bis(4-hydroxyphenyl)-2-methylbutane, 1,1-bis(4-hydroxyphenyl)phenylethane, 1,3-bis[2-(4-hydroxyphenyl)-2-propyl]benzene (bisphenol M), 1,1-bis (4-hydroxyphenyl)-p-diisopropylbenzene, 2,2-bis(3-methyl-4-hydroxyphenyl) propane, 2,2-bis (3-chloro-4-hydroxyphenyl)propane, bis(3,5-dimethyl-4-hydroxyphenyl) methane, 2,2-bis(3,5-dimethyl-4-hydroxyphenyl)propane, bis(3,5-dimethyl-4-hydroxyphenyl) sulfone, 2,4-bis (3,5-dimethyl-4-hydroxyphenyl)-2-methylbutane, 1,1-bis (3,5-dimethyl-4-hydroxyphenyl)-p-diisopropylbenzene, 2,2-bis (3,5-dichloro-4-hydroxyphenyl) propane, 2,2-bis (3,5-dibromo-4-hydroxyphenyl)propane, 1,3-bis [2-(3,5-dimethyl-4-hydroxyphenyl)-2-propyl]benzene and 1,1-bis(4-hydroxyphenyl)-3,3,5-trimethylcyclohexane (bisphenol TMC) and the bisphenols of the formulae (I) to (III)

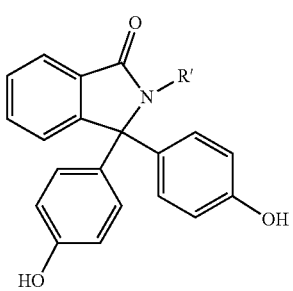

(I)

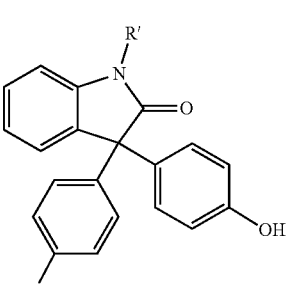

(II)

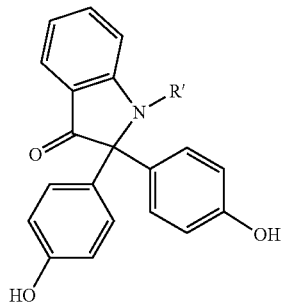

(III)

in which each R' represents a $C_1$- to $C_4$-alkyl radical, aralkyl radical or aryl radical, preferably a methyl radical or phenyl radical, most preferably a methyl radical. Very particular preference is given to the homopolycarbonate based on bisphenol A.

Particularly preferred dihydroxyaryl compounds are 4,4'-dihydroxydiphenyl, 1,1-bis(4-hydroxyphenyl)phenylethane, 2,2-bis(4-hydroxyphenyl)propane, 2,2-bis (3,5-dibromo-4-hydroxyphenyl)propane, 2,2-bis (3,5-dichloro-4-hydroxyphenyl)propane, 2,2-bis (3,5-dimethyl-4-hydroxyphenyl) propane, 1,1-bis (4-hydroxyphenyl)cyclohexane and 1,1-bis (4-hydroxyphenyl)-3,3,5-trimethylcyclohexane (bisphenol TMC), and also the dihydroxyaryl compounds of formulae (I), (II) and/or (III).

These and further suitable dihydroxyaryl compounds are described, for example, in U.S. Pat. No. 2,999,835 A, 3,148,172 A, 2,991,273 A, 3,271,367 A, 4,982,014 A and 2,999,846 A, in German published specifications 1,570,703 A, 2,063,050 A, 2,036,052 A, 2,211,956 A and 3,832,396 A, in French patent 1,561,518 A1, in the monograph "H. Schnell, Chemistry and Physics of Polycarbonates, Interscience Publishers, New York 1964, p. 28 ff.; p. 102 ff.", and in "D. G. Legrand, J. T. Bendler, Handbook of Polycarbonate Science and Technology, Marcel Dekker New York 2000, p. 72ff.".

In the case of homopolycarbonates only one dihydroxyaryl compound is used; in the case of copolycarbonates two or more dihydroxyaryl compounds are used.

Examples of suitable carbonic acid derivatives are phosgene or diphenyl carbonate.

Suitable chain terminators employable in the production of the polycarbonates include both monophenols and monocarboxylic acids. Suitable monophenols are for example phenol itself, alkylphenols such as cresols, p-tert-butylphenol, cumylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, 2,4,6-triiodophenol, p-iodophenol and mixtures thereof.

Preferred chain terminators are moreover phenols which are mono- or polysubstituted with linear or branched, preferably unsubstituted $C_1$ to $C_{30}$ alkyl radicals or with tert-butyl. Particularly preferred chain terminators are phenol, cumylphenol and/or p-tert-butylphenol.

Suitable monocarboxylic acids are moreover benzoic acid, alkylbenzoic acids and halobenzoic acids.

The amount of chain terminator to be used is preferably 0.1 to 5 mol %, based on moles of dihydroxyaryl compounds used in each case. The chain terminators may be added before, during or after the reaction with a carbonic acid derivative.

Suitable branching agents are the trifunctional or more than trifunctional compounds known in polycarbonate chemistry, in particular those having three or more than three phenolic OH groups.

Suitable branching agents are for example phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxypheny l)ethane, tri(4-hydroxyphenyl)phenylmethane, 2,2-bis [4,4-bis (4-hydroxyphenyl) cyclohexyl]propane, 2,4-bis (4-hydroxyphenylisopropyl)phenol, 2,6-bis (2-hydroxy-5$^1$-methylbenzyl)-4-methylphenol, 2-(4-hydroxyphenyl)-2-(2,4-dihydroxypheny l)propane, hexa-(4-(4-hydroxyphenylisopropyl)phenyl) orthoterephthalate, tetra (4-hydroxyphenyl)methane, tetra(4-(4-hydroxyphenylisopropyl)phenoxy)methane and 1,4-bis((4', 4"-dihydroxytriphenyl)methyl)benzene and 2,4-dihydroxybenzoic acid, trimesic acid, cyanuric chloride and 3,3-bis(3-methyl-4-hydroxyphenyl)-2-oxo-2,3-dihydroindole.

The amount of any branching agents to be used is preferably 0.05 mol % to 2.00 mol %, based again on moles of dihydroxyaryl compounds used in each case.

The branching agents can either form an initial charge with the dihydroxyaryl compounds and the chain terminators in the aqueous alkaline phase or can be added, dissolved in an organic solvent, before the phosgenation. In the case of the transesterification method, the branching agents are used together with the dihydroxyaryl compounds. The aromatic polycarbonates present in the compositions of the invention are preferably produced by the interfacial method.

Preference is given to using linear polycarbonates.

The aromatic polycarbonates of the present invention preferably have weight-average molecular weights $M_w$ between 15 000 and 25 000 g/mol, preferably between 15 000-24 000 g/mol, further preferably between 16 000-23 500 g/mol, even further and especially preferably between 18 000-22 500 g/mol. The values are applicable to determination by gel permeation chromatography using dichloromethane as eluent, calibration with linear polycarbonates (composed of bisphenol A and phosgene) of known molar mass distribution from PSS Polymer Standards Service GmbH, Germany; calibration according to method 2301-0257502-09D (2009 German Edition) from Currenta GmbH & Co. OHG, Leverkusen. The eluent for the calibration is likewise dichloromethane. Column combination of crosslinked styrene-divinylbenzene resins. Diameter of analytical columns 7 5 mm; length: 300 mm. Particle sizes of column material: 3 μm to 20 μm. Concentration of solutions: 0.2% by weight. Flow rate: 1.0 ml/min, temperature of solutions: 30° C. Detection using a refractive index (RI) detector.

The MVR value of the (pure) aromatic polycarbonate measured to ISO 1133:2012-03 at 300° C. and 1.2 kg is preferably 14 to 17 cm$^3$/(10 min), more preferably 18 to 65 cm$^3$/(10 min).

The reported $M_w$ and MVR values are based on the aromatic polycarbonates present in the composition in their entirety.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

It will be apparent that the translucent thermoplastic composition may contain further components. In principle, these may be a wide variety of different components as present in thermoplastic compositions. In principle, any translucent black or translucent gray thermoplastic composition is useful, provided that the viscosity of the molding compound is not elevated to such a degree as to hinder sufficient wetting of the stone surface and sufficient penetration of the fissures and pores in the stone.

Suitable translucent thermoplastic compositions for the carrier layer contain a) at least 90% by weight of aromatic polycarbonate (=component a), b) a colorant mixture composed of colorants other than component c and component e, comprising at least two colorants in a total amount of up to 0.1% by weight, c) 0.00001% by weight to 0.05% by weight of carbon black, d) 0.00001% to 2% by weight of at least one scattering additive from the group consisting of acrylate-based scattering additives and/or silicone-based scattering additives, e) optionally up to 1.0% by weight of at least one white pigment, f) optionally one or more further additives.

According to the invention, "up to" also includes the respective limit, including the range of rounding. "Up to 2% by weight" thus includes not only 2% by weight and the values below but also, for example, 2.2% by weight.

The FIGURES in % by weight are each based on the overall composition.

The colorants (component b) mentioned as constituents of suitable translucent compositions are preferably selected from the group consisting of colorants based on anthraquinone, anthrapyridone, perinone, methine or quinoline. "Based on" in this specific context means that the base structure of the colorants of component b) has the compound specified in each case as a base structure, which can still be seen. These base structures preferably have substituents.

Colorants are suitable in principle are colorants of the following structures (4a) to (24):

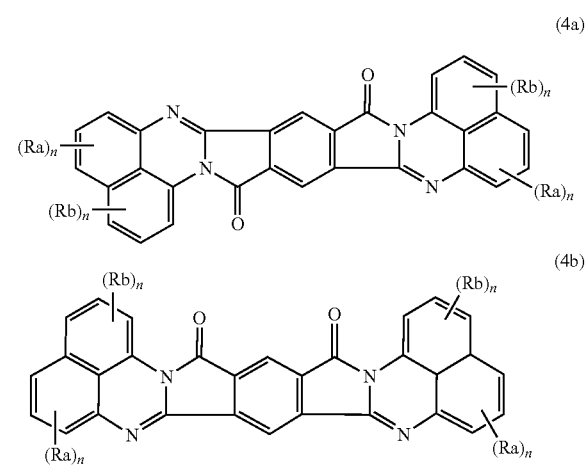

where

Ra and Rb are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl, n independently of the respective R is a natural number from 0 to 3, where the radical is hydrogen when n=0;

even further preferably, Ra and/or Rb are Cl and are in o- and/or p positions to the carbon atom which bear the amine functionalities, for example diorthochloronaphthalino, diortho-, mono-para-chlornaphthalino, and monoorthonaphthalino. In addition, in a preferred embodiment, Ra and Rb are each a tert-butyl radical which is preferably in the meta position to the carbon atoms bearing the nitrogen functionalities.

In a particularly preferred embodiment, n=0 in all rings, and so all Ra and Rb=H.

(5a)

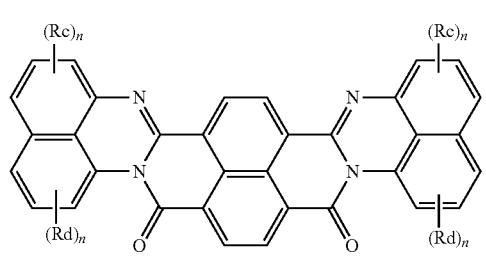

(5b)

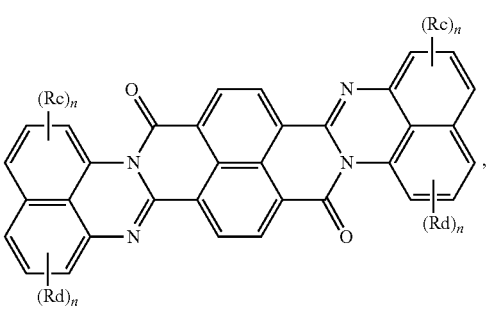

where

Rc and Rd are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl, n independently of the respective R is a natural number from 0 to 3, where the radical is hydrogen when n=0; even further preferably, Rc and/or Rd are Cl and are in o- and/or p positions to the carbon atom which bear the amine functionalities, for example diorthochloronaphthalino, diortho-, mono-para-chlornaphthalino, and monoorthonaphthalino. In addition, in a preferred embodiment, Rc and Rd are each a tert-butyl radical which is preferably in the meta position to the carbon atoms bearing the nitrogen functionalities.

In a particularly preferred embodiment, n=0 in all rings, and so all Rc and Rd=H.

The structures (4a) and (4b), and (5a) and (5b) are isomers of one another. The respective isomers may each be used alone or in a mixture. In a particular embodiment, a 1:1 isomer mixture (based on the respective amount of isomer in the isomer mixture in % by weight) of (4a) and (4b) or (5a) and (5b) is used.

(6a)

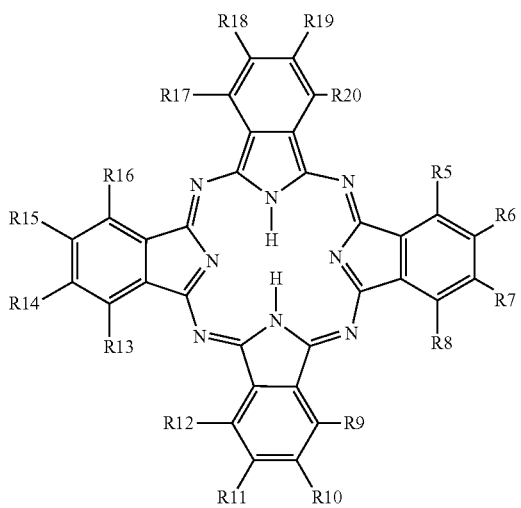

(6b)

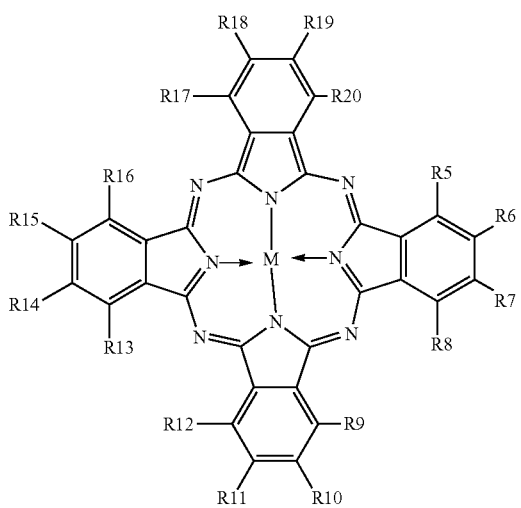

The radicals R(5-20) are in each case independently of one another hydrogen, methyl, ethyl, propyl, isopropyl, butyl, isobutyl, tert-butyl, pentyl, neopentyl, hexyl, thexyl, fluorine, chlorine, bromine, sulfone, CN.

Preferably, R(5-20) is the same in all positions. More preferably R(5-20) is H in all positions. In an alternative embodiment R(5-20) is Cl in all positions.

M is preferably aluminum (with R=H: aluminum phthalocyanine, CAS: 14154-42-8), nickel (with R=H: nickel phthalocyanine, CAS: 14055-02-8), cobalt (with R=H: cobalt phthalocyanine, CAS: 3317-67-7), iron (with R=H: iron phthalocyanine, CAS: 132-16-1), zinc (with R=H: zinc phthalocyanine, CAS: 14320-04-08), copper (with R=H: copper phthalocyanine, CAS: 147-14-8; with R=H and Cl: polychloro copper phthalocyanine, CAS: 1328-53-6; with R=Cl: hexadecachlorophthalocyanine, CAS: 28888-81-5; with R=Br: hexadecabromophthalocyanine, CAS: 28746-04-5), manganese (with R=H: manganese phthalocyanine, CAS: 14325-24-7) and/or magnesium.

The combination of M=Cu and R=H for all positions is especially preferred. For instance, a compound of the structure (6b) with M=Cu and R(5-20)=H is obtainable as Heliogen® Blue K 6911D or Heliogen® Blue K 7104 KW from BASF AG, Ludwigshafen.

Compounds of the structure (6a) are available, for example, as Heliogen® Blue L 7460 from BASF AG, Ludwigshafen.

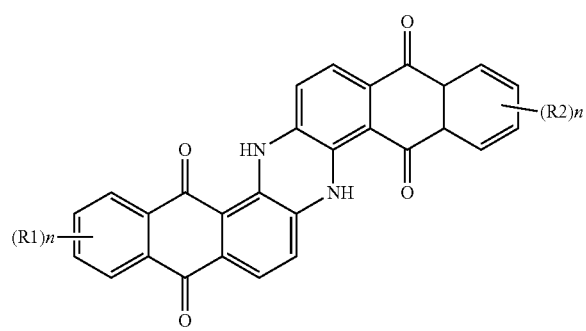
(7)

where

R1 and R2 are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl, n is a natural number between 0 and 4.

In a particularly preferred embodiment, n=0 in all rings, and so all R1 and R2=H.

Colorants of this structure (7) are commercially available under the Paliogen Blue series from BASF AG.

In the case of use of colorants of the structure (7), preference is given especially to the pigments having a bulk volume (determined to DIN ISO 787-11) of 2 l/kg-10 l/kg, preferably 3 l/kg-8 l/kg, a specific surface area (determined to DIN 66132:1975-07) of 5 $m^2$/g-60 $m^2$/g, preferably 10 $m^2$/g-55 $m^2$/g, and a pH (determined to DIN ISO 787-9: 1995-04) of 4-9,

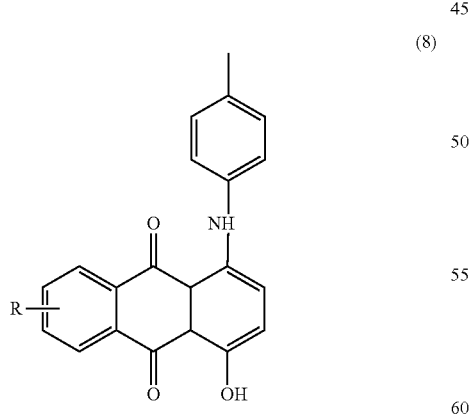
(8)

where

R is selected from the group consisting of H and p-methylphenylamine radical; preferably R =H.

Colorants of this kind are available, for example, under the Macrolex® Violet B trade name from Lanxess AG.

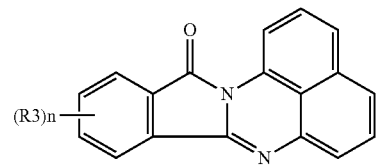
(9)

where R3 is preferably halogen, especially preferably Cl, where, more preferably n=4. Preference is further given to an embodiment with n=0, such that R3=H.

Colorants of this kind are available, for example, as Macrolex® Orange 3G or Macrolex® Red EG from Lanxess AG.

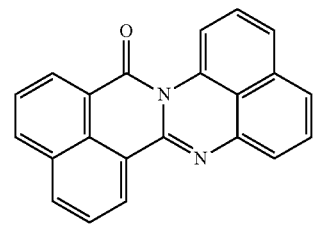
(10)

Colorants of this kind are available, for example, under the Macrolex® Red E2G brand name from Lanxess AG, CAS Number 89106-94-5.

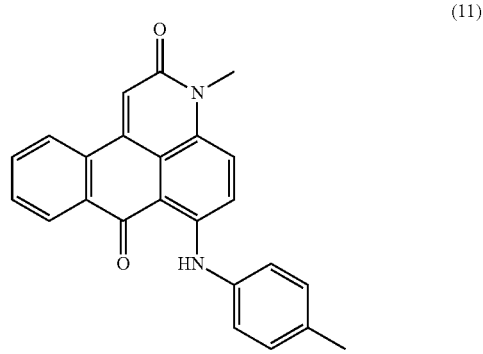 [SMILES: Cc1ccc(Nc2ccc3c4c(cc(=O)n3C)-c3ccccc3C(=O)c24)cc1]
(11)

This colorant with Color Index 68210 is available under the "Macrolex® Red 5B" or else "Solvent Red 52" name.

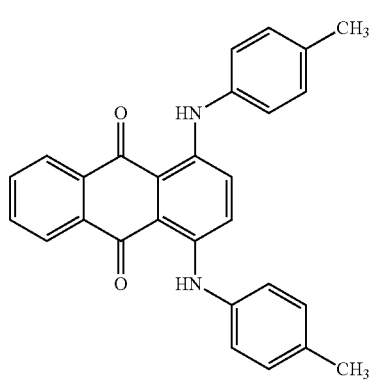
(12)

The colorant of the structure (12) is known by the Macrolex Green 5B name from Lanxess Deutschland GmbH, Color Index number 61565, CAS Number: 128-90-3, and is an anthraquinone dye.

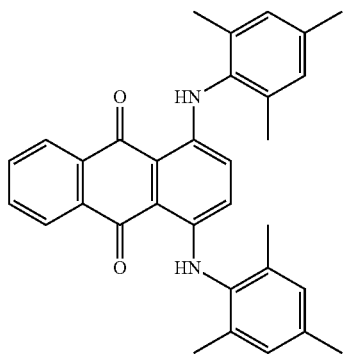

(13)

This colorant is available under the "Keyplast Blue KR" or "Solvent Blue 104" name, CAS Number 116-75-6, Color Index-Number: 61568.

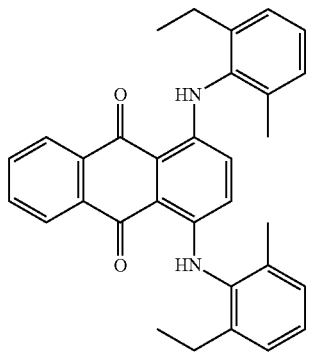

(14)

This colorant is available under the "Macrolex Blue 3R Gran" name, CAS Number 41611-76-1.

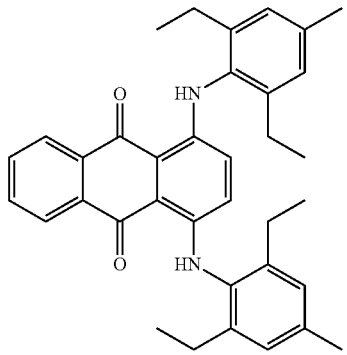

(15)

This colorant with Color Index 615290 is commercially available under the "Keyplast Blue E", "Macrolex® Blue RR" or "Solvent Blue 97" name.

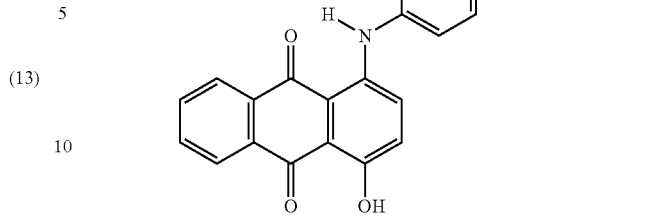

(16)

This colorant with CAS Number 81-48-1 is available under the "Macrolex Violet B" or "Solvent Violet 13" name, Color Index 60725, from Lanxess AG.

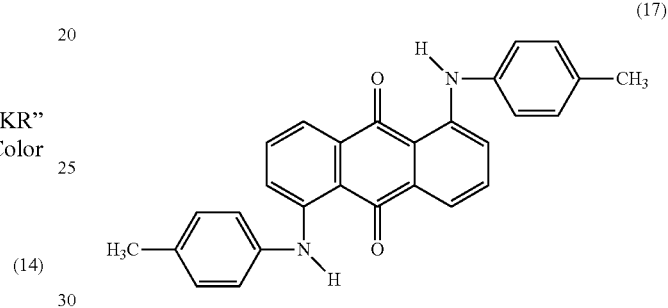

(17)

This colorant is commercially available under the "Macrolex® Violet 3R" or "Solvent Violet 36" name.

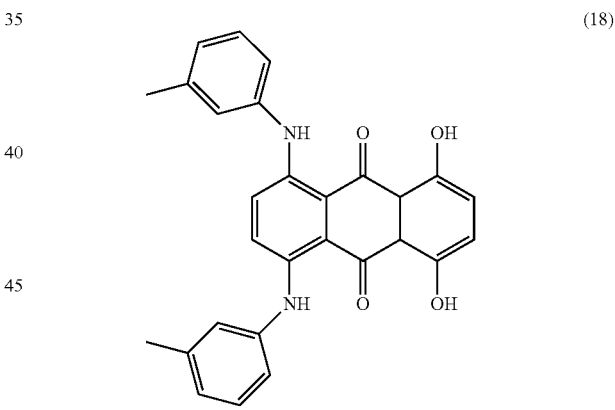

(18)

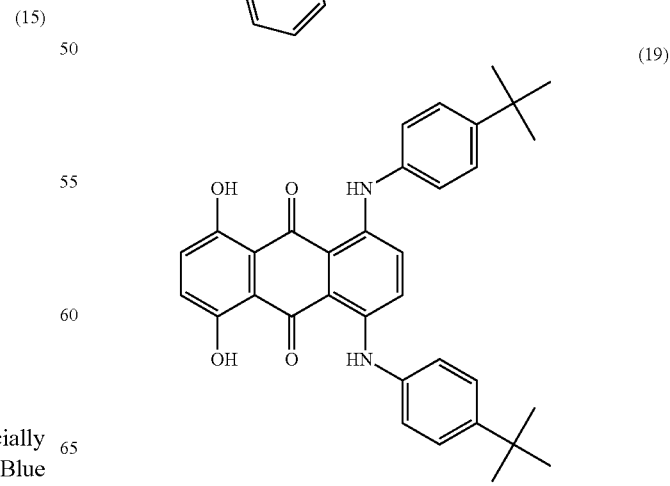

(19)

(20)

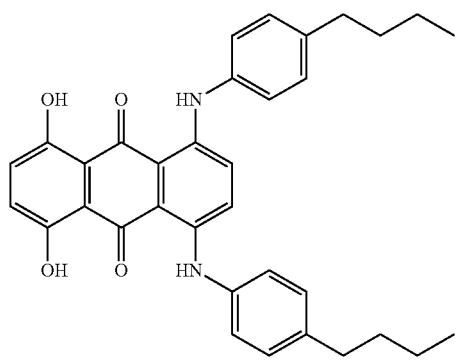

Colorants of this kind are available, for example, under the "Macrolex Green G" trade name from Lanxess AG.

(21)

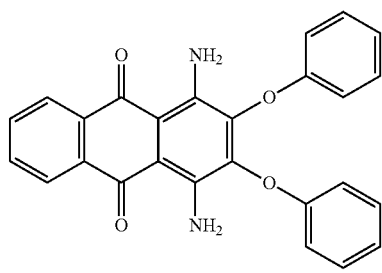

This colorant is available under the "Macrolex RedViolet R" name, CAS Number 6408-72-6.

(22)

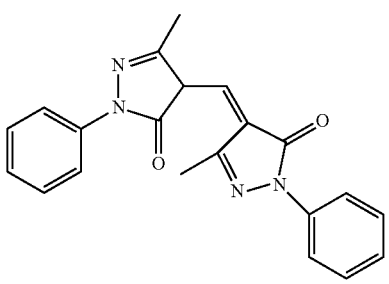

This colorant is available under the "Macrolex Yellow 3G" or "Solvent Yellow 93" name with Color Index 48160.

(23)

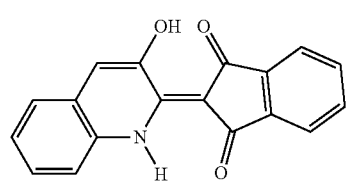

This colorant is commercially available under the "Macrolex Yellow G" or "Solvent Yellow 114" name with Color Index 47020.

The amount of colorants of component b) in total in the molding compounds is up to 0.1% by weight, preferably up to 0.05% by weight, further preferably 0.0005% by weight to 0.02% by weight.

The molding compounds preferably comprise a colorant based on anthraquinone and a further colorant based on anthraquinone or anthrapyridone. Further preferably, the molding compounds do not comprise any further colorants beyond that.

The molding compounds further preferably comprise at least one colorant of the following formula (24):

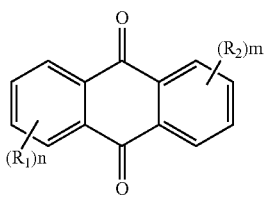

(24)

where
$R_1$ is a substituted or unsubstituted phenylamine radical, preferably an unsubstituted phenylamine radical,
$R_2$ is a substituted or unsubstituted phenylamine radical, preferably a p-methylphenylamine radical or a 2,6-diethyl-4-methylphenylamine radical,
n is a natural number from 0 to 4, preferably 0 or 1, and
m is a natural number from 0 to 4, preferably 1 or 2.
If n=0, there is no substituent on the respective radical that would replace H.

More preferably, at least one colorant of the formula (15) is present.

Even more preferably, a colorant of the formula (17) is present as a further colorant.

Even more preferably, a colorant of the formula (11) is alternatively present as a further colorant.

Most preferably, aside from the colorants (15) and (17) or (15) and (11) and optionally (13), no further colorant is present in the molding compounds of the invention.

Alternatively preferred colorants which represent one of the at least two colorants of component b) are
the colorant of the structure (23)
the colorant of the structure (22),
colorants of the formula (9), especially commercially available under the "Macrolex Red EG" or "Solvent Red 135" name with Color Index 564120;
the colorant of the structure (16),
the colorant of the structure (12).

Colorants of component b in any case do not comprise any colorants of components c and e.

Compositions suitable for the translucent carrier layer preferably contain 0.00001% to 0.05% by weight, further preferably 0.0003% to 0.020% by weight, more preferably 0.0004% to 0.015% by weight of carbon black, most preferably 0.00045% to 0.014% by weight of carbon black (component c).

The carbon black is preferably finely dispersed in the organic polymer matrix and is further preferably in nanoscale form, especially a nanoscale coloring carbon black. Suitable carbon blacks have an average particle size, determined by scanning electron microscopy, preferably less than 100 nm, further preferably less than 75 mm, even further preferably less than 50 nm and more preferably less than 40 nm, the average particle size preferably being greater than 0.5 nm, further preferably greater than 1 nm and more preferably greater than 5 nm, most preferably from 10 to 30 nm, exceptionally preferably from 10 to 20 nm.

Commercially available carbon blacks that are suitable in the context of the invention are obtainable in a multitude of trade names and forms, such as pellets or powders. For instance, suitable carbon blacks are available under the BLACK PEARLS® trade names, as wet-processed pellets under the ELFTEX®, REGAL® and CSX® names, and in a flaky form as MONARCH®, ELFTEX®, REGAL® and MOGUL®, all from Cabot Corporation. Especially preferred are carbon blacks that are traded under the BLACK PEARLS® trade name (CAS No. 1333-86-4).

In a particularly preferred embodiment, the carbon black types have particle sizes of 10 nm-30 nm, especially 10 to 20 mm, and have a specific surface area of preferably 35 $m^2$–138 $m^2$ per g ($m^2/g$), determined according to ISO 9277:2014-01 (BET method). The carbon black may be treated or untreated. For instance, the carbon black may have been treated with particular gases or with silica or organic substances, for example butyllithium. Such a treatment can achieve modification or functionalization of the surface. This can promote compatibility with the matrix used correspondingly. Especially preferred are carbon blacks that are traded under the BLACK PEARLS® trade name (CAS No. 1333-86-4).

The compositions that are used for the translucent material of the carrier layer preferably contain scattering additive (component d), specifically in amounts of 0.00001% by weight to 2% by weight, preferably 0.01% by weight to 1.0% by weight, further preferably 0.05% by weight to 0.50% by weight. The scattering additive may be a single scattering additive or else a mixture of two or more scattering additives. The scattering additive is selected from the group of the acrylate-based scattering additives and/or the silicone-based scattering additives. There may be one scattering additive from this group or alternatively a mixture. More preferably, the compositions comprise acrylate-based scattering additive as scattering agent. Most preferably, in addition, no silicone-based scattering agent is present.

Scattering additives in the context of the invention are thus none of the white pigments mentioned as a separate component (component e).

The scattering additives preferably have a high thermal stability to 300° C. in order not to be broken down at the processing temperatures of polycarbonate. In addition, the scattering additives should not have any functionalities that lead to perceptible degradation of the polymer chain Preferably, the scattering additives should not lead to any degradation of the polymer chain of the polycarbonate at all.

Preferred acrylate-based scattering agents are polyalkylacrylates having preferably 1 to 8 carbon atoms in the alkyl group, further preferably having an average particle size (number average) of 0.5 μm to 80 μm, preferably 2 μm to 40 μm, especially 3 μm to 15 μm, especially 3 μm to 9 μm. Mixtures of alkyl acrylates may likewise be used (homo- or copolymers). Preferably, the acrylate-based scattering agents have been crosslinked. Suitable crosslinking agents are the crosslinking agents known for acrylates. Preferred crosslinking agents are glycol-based crosslinkers such as, in particular, ethylene glycol dimethacrylate.

Particularly preferred acrylate-based scattering additives are polymethylmethacrylate-containing scattering agents, for example polymeric particles of polymethylmethacrylate and polybutylacrylate having core-shell morphology, available, for example, as Paraloid® EXL 5136 or Paraloid® EXL 5137 from Rohm&Haas, or else partly or fully crosslinked spherical or non-spherical acrylate particles, for example those from the Techpolymer® MBX series from Sekisui Plastics, Techpolymer® MBX-S or MBX-8. Scattering additives having core-shell morphology are described, for example, in EP 0 634 445 B1 as "polymeric particle (b)".

The silicone-based scattering additives preferably have an average particle size (number-average) of 0.5 μm to 100 μm, preferably 0.5 μm to 20 μm, especially 1 μm to 6 μm, determined by means of laser scattering to ISO 13320:2009.

Silicone-based suitable scattering agents are silsesquioxanes, organic silicon compounds. A silsesquioxane used with preference has the general formula [$RSiO3/2$]n with R=H, alkyl, aryl or alkoxy. Particular preference is given to polymethylsilsesquioxane. Commercially available suitable silsesquioxanes are, for example, products from the Tospearl® product group from Momentive, USA, Tospearl® TSR9000 or 120S or Ganzpearl Si-020 from Ganz Chemical Co., Ltd.

If the material chosen for the carrier layer is not translucent black but translucent gray, the respective composition contains up to 1.0% by weight of white pigment. The white pigment present is preferably zinc oxide, zinc sulfide, barium sulfate and/or titanium dioxide, further preferably titanium dioxide and/or barium sulfate; titanium dioxide is present with particular preference as white pigment. The white pigment may consist of one of these two components only or else comprise one or more other white pigments from this list or selected from the group of the white pigments in general.

If barium sulfate is present, the proportion in the overall composition is typically 0.1% to 1.0% by weight of barium sulfate.

If the white pigment comprises titanium dioxide, the amount of the white pigment is preferably 0.03% to 1.0% by weight, further preferably 0.03% to 0.5% by weight, more preferably to 0.1% by weight. Very particular preference is given here to 95% by weight of the white pigment, based on the total amount of white pigments, of titanium dioxide. Exceptionally preferably, titanium dioxide is the sole white pigment here.

The compositions of the carrier layer may optionally comprise one or more further additives (component f) other than components b) to e), provided that these do not lead to loss of translucence. Typically 0% to 5% by weight, preferably 0.05% by weight to 3% by weight, further preferably 0.1% by weight to 1% by weight, of further additives are present. Here as elsewhere, unless stated otherwise, the percentages by weight are based on the respective overall composition.

Customary polymer additives as may be present as component f are described, for example, in EP-A 0 839 623, WO-A 96/15102, EP-A 0 500 496 or "Plastics Additives Handbook", Hans Zweifel, 5th Edition 2000, Hanser Verlag, Munich. Such further additives are, for example, demolding agents, antioxidants, flame retardants, anti-dripping agents, thermal stabilizers, optical brighteners, flow improvers, opacifiers other than component d, antistats, UV absorbers and/or IR absorbers.

Further additives present with preference in the composition of the carrier layer are solely one or more demolding agents, UV absorbers, colorants, scattering particles and/or one or more thermal stabilizers.

Suitable thermal stabilizers are selected from the groups of the phosphates, phosphites, phosphonites and phosphines. Examples are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite (Irgafos® 0 168), diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bis(2,4-dicumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tert-butyl-12H-dibenzo [d, g]-1,3,2-dioxaphosphocine, bis (2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenzo [d,g]-1,3,2-dioxaphosphocine, 2,2',2''-nitrilo [triethyltris (3,3',5,5 tetra-tert-butyl-1,1'-biphenyl-2,2'-diyl) phosphite], 2-ethylhexyl (3,3',5,5$^1$-tetra-tert-butyl-1,1'-biphenyl-2,2'-diyl) phosphite, bis(2,6-di-tert-butyl-4-methylphenyl)pentaerythritol diphosphites (PEP-36), 5-butyl-5-ethyl-2-(2,4,6-tri-tert-butylphenoxy)-1,3,2-dioxaphosphirane, triphenylphosphine (TPP), trialkylphenylphosphine, bisdiphenylphosphinoethane or a trinaphthylphosphine. Especially preferred are triphenylphosphine (TPP), Irgafos® 168 (tris(2,4-di-tert-butylphenyl) phosphite) and tris(nonylphenyl) phosphite, PEP-36 (bis(2,6-di-tert-butyl-4-methylphenyl) pentaerythritol diphosphite) or mixtures thereof.

Phosphate stabilizers are, for example, phosphates of the formula (IV) or mixtures of these phosphates

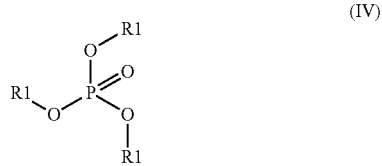

where R1 independently represents branched alkyl radicals and/or optionally substituted alkyl radicals, where the alkyl radical is preferably a $C_1$- to $C_{18}$-alkyl, further preferably a $C_1$- to $C_8$-alkyl radical. If a phosphate stabilizer is present, it is more preferably tri(2-ethylhexyl) phosphate (triisooctyl phosphate).

The aryl radical is preferably substituted by $C_1$- to $C_8$-alkyl, branched $C_1$- to $C_8$-alkyl, or cumyl, where the substituents may be the same or different, but preference is given to identical substituents. It is preferable when the aryl radicals are substituted in positions 2 and 4 or 2, 4 and 6. Very particular preference is given to tert-butyl substituents in these positions.

It is more preferable when all R1 are identical.

In addition, it is possible to use phenolic antioxidants, for example alkylated monophenols, alkylated thioalkylphenols, hydroquinones and alkylated hydroquinones. Preference is given to using Irganox® 1010 (pentaerythritol 3-(4-hydroxy-3,5-di-tert-butylphenyl)ppropionate; CAS: 6683-19-8) and/or Irganox 1076® (2,6-di-tert-butyl-4-(octadecanoxycarbonylethyl)phenol). Particular preference is given to using Irganox 1076® (2,6-di-tert-butyl-4-(octadecanoxycarbonylethyl)phenol).

In a specific embodiment, the phosphine compounds of the invention are used together with a phosphite or a phenolic antioxidant or a mixture of the two latter compounds.

In a preferred embodiment, the stabilizer system consists of triphenylphosphine, a mixture of triphenylphosphine and a phenolic antioxidant such as Irganox® 1076 or Irganox® 1010, and/or a combination of phenolic antioxidant and phosphite, preferably of a mixture of Irganox® 1076 or Irganox® 1010 and Irgafos® 168 or PEP-36.

In a further preferred embodiment, the stabilizer system consists of a phosphine, a phosphite and a phenolic antioxidant, for example triphenylphosphine, Irganox® 1076 and Irgafos® 168.

Suitable mold release agents are, for example, the esters or partial esters of mono- to hexahydric alcohols, especially of glycerol, of pentaerythritol or of Guerbet alcohols. Monohydric alcohols are, for example, stearyl alcohol, palmityl alcohol and Guerbet alcohols. An example of a dihydric alcohol is glycol; an example of a trihydric alcohol is glycerol; examples of tetrahydric alcohols are pentaerythritol and mesoerythritol; examples of pentahydric alcohols are arabitol, ribitol and xylitol; examples of hexahydric alcohols are mannitol, glucitol (sorbitol) and dulcitol.

The esters are preferably the monoesters, diesters, triesters, tetraesters, pentaesters and hexaesters or mixtures thereof, especially statistical mixtures, of saturated aliphatic $C_{10}$ to $C_{36}$ monocarboxylic acids and optionally hydroxymonocarboxylic acids, preferably with saturated aliphatic $C_{14}$ to $C_{32}$ monocarboxylic acids and optionally hydroxymonocarboxylic acids.

The commercially available fatty acid esters, especially of pentaerythritol and of glycerol, may contain <60% different partial esters as a result of the preparation.

Examples of saturated aliphatic monocarboxylic acids having 10 to 36 carbon atoms are capric acid, lauric acid, myristic acid, palmitic acid, stearic acid, hydroxystearic acid, arachic acid, behenic acid, lignoceric acid, cerotic acid and montanic acids. Particularly suitable demolding agents as component f) of the composition of the invention are, for example, pentaerythritol tetrastearate (PETS) or glycerol monostearate (GMS). In a specific embodiment of the invention, the overall composition comprises demolding agents in a proportion of 0 ppm to 3000 ppm, preferably 100 ppm to 1000 ppm, and further preferably 150 ppm to 500 ppm, based on the mass of the overall composition.

Preferred UV absorbers are compounds having minimum transmittance below 400 nm and maximum transmittance above 400 nm. Such compounds and the production thereof are known from the literature and are described, for example, in EP-A 0 839 623, WO-A 96/15102 and EP-A 0 500 496. Ultraviolet absorbers particularly suitable for use in the composition of the invention are benzotriazoles, triazines, benzophenones and/or arylated cyanoacrylate s.

Very particularly suitable ultraviolet absorbers are hydroxybenzotriazoles such as 2-(3',5'-bis(1,1-dimethylbenzyl)-2'-hydroxyphenyl)benzotriazole (Tinuvin® 234, Ciba Speziälitatenchemie, Basle), 2-(2'-hydroxy-5'-(tert-octyl) phenyl)benzotriazole (Tinuvin® 329, Ciba Speziälitatenchemie, Basle), 2-(2'-hydroxy-3'-(2-butyl)-5'-(tert-butyl)phenyl)benzotriazole (Tinuvin® 350, Ciba Speziälitatenchemie, Basle), bis(3-(2H-benztriazolyl)-2-hydroxy-5-tert-octypmethane, (Tinuvin® 360, Ciba Speziälitatenchemie, Basle), (2-(4,6-diphenyl-1,3,5-triazin-2-yl)-5-(hexyloxy)phenol (Tinuvin® 1577, Ciba Speziälitatenchemie, Basle), and the benzophenones 2,4-dihydroxybenzophenone (Chimasorb® 22, Ciba Speziälitatenchemie, Basle) and 2-hydroxy-4-(octyloxy)benzophenone (Chimassorb® 81, Ciba, Basle), 2-cyano-3,3-diphenyl-2-propenoic acid 2-ethylhexylester, 2,2-bis [ [ (2-cyano-1-oxo-3,3-diphenyl-2-propenyl) oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Speziälitatenchemie, Basle) or tetraethyl 2,2'-(1,4-phenylenedimethylidene)bismalonate (Hostavin® B-Cap, Clariant AG).

Exceptionally preferred UV absorbers are, for example, Tinuvin 360, Tinuvin 350, Tinuvin® 329, Hostavin® B-CAP, more preferably TIN 329 and Hostavin® B-Cap.

It is also possible to use mixtures of these ultraviolet absorbers.

There are no particular restrictions with regard to the amount of the ultraviolet absorber present in the composition. In a specific embodiment of the invention, the composition comprises ultraviolet absorbers in an amount of 0 ppm to 6000 ppm, preferably 500 ppm to 5000 ppm, and further preferably 1000 ppm to 2000 ppm, based on the overall composition.

Anti-dripping agents are preferably fluorine-containing anti-dripping agents, especially polytetrafluoroethylene.

The thickness of the carrier layer can be chosen freely according to the respective desired use. Typically, the thickness of the carrier layer is chosen such that the carrier layer imparts sufficient stability to the multilayer body, but not more material than necessary is used, since this not only incurs unnecessary costs but also unnecessarily increases the weight of the component. Especially in the case of automotive interior elements, it is important that a minimum weight is attained for functional components. Preferably, therefore, the thickness is in the range from 0.5 to 6 mm, further preferably in the range of 1.0 to 5 mm, even further preferably in the range from 1.5 to 4 mm. This thickness is averaged over the total area of the carrier layer of thermoplastic material. The variance of the thickness at any individual point in the layer from the thickness averaged over the total area is preferably not more than ±10%, further preferably not more than ±5%. Since the stone layer typically has a slightly irregular surface and the material here runs into the interstices, there is an insignificant slight variance in many places from the averaged value.

The carrier layer preferably fully covers the stone layer, or projects beyond it at at least one lateral edge.

The stone layer a2 is a layer of a metamorphic rock or a sedimentary rock. There are multiple relatively discrete layers here, which can be removed from the natural stone material as thin layers. Suitable stone materials are, for example, clay rocks in slatelike form or slate clay, limestone, sandstone, mudstone, clay shale, quartzite, phyllite, mica shale, chlorite schist, gneiss, talc schist, blue or glaucophane schist, colored slate, prasinite, epidote-amphibolite, amphibolite, embrechite, agmatite, calcareous schist, mylonite, argillite, migmatite, marble, serpentinite, eclogite, schist, fruchtschiefer or granulite. The stone layer preferably comprises colored slate, mica shale, limestone, sandstone or marble; it further preferably consists of these rocks. In principle, the stone layer may be composed of different stone elements and may constitute, for example, a mosaic of one or more stone types. However, the stone layer preferably consists of one stone type and has been worked in one piece.

The thickness of the stone layer is ≤2 mm, preferably ≤1 mm, further preferably ≤0.5 mm, especially preferably ≤0.3 mm, where the thickness is averaged over the entire two-dimensional face of the stone layer. "Two-dimensional face" is the face of the stone layer oriented toward the visible face in the multilayer body, i.e. intended to shape the visual appearance of the multilayer body, and the face opposite that face. The stoneware chosen should in any case be thin, such that it is still transparent to the desired degree. The stone layer preferably has a coherent grain microstructure.

It is further preferable that the stone layer, at least on the flat side facing the transparent layer, has a topography having maximum roughness Rz of preferably at least 0.1 µm, more preferably at least 0.5 µm, further preferably 0.5 to 10 000 µm, more preferably 1.0 to 5000 µm. The maximum roughness Rz is defined here by the absolute vertical distance between the maximum profile peak height and the maximum profile valley depth. The measurement distance here is preferably at least 2 cm. These values of maximum roughness Rz are advantageous because, in the case of incidence of light from the side via one or more lateral edges, this topography is highlighted optically by throwing of shadows, refraction of light and the like at the rough stone surface, and three-dimensional impression perceived by our eye is enhanced.

The transparent layer a3 is likewise a layer of a thermoplastic composition. The statements already made with regard to the carrier layer are applicable here in principle, except that the components of the thermoplastic composition should be chosen such that a composition that is transparent for the purposes of the invention is obtained. Further additives present with preference in the composition of the transparent layer are solely one or more demolding agents, UV absorbers and/or one or more thermal stabilizers.

The transparent layer must have a thickness which is sufficient but not too thick, so that edge-lighting of the multilayer body is possible through this layer. At the same time, there is an interest in minimizing the thickness of the transparent layer a3, in order not to unnecessarily increase the weight of the LED lighting unit. The thickness is therefore in the range from 1 to 6 mm, further preferably in the range of 2 to 5 mm, even further preferably in the range from 2.5 to 4 mm, where the thickness is averaged over the total area of the transparent layer. The variance of the thickness at any individual point in the transparent layer from the thickness averaged over the total area is preferably not more than ±10%.

In order to ensure sufficient flowability of the thermoplastic compositions and thus sufficiently good processibility, the MVR value of the compositions (measured to ISO 1133:2012-03 at 300° C. and 1.2 kg) should preferably be between 14 $cm^3/(10\ min)$ and 80 $cm^3/(10\ min)$, further preferably between 20 $cm^3/(10\ min)$ and 80 $cm^3/(10\ min)$, even further preferably between 30 $cm^3/(10\ min)$ and 80 $cm^3/(10\ min)$ and especially preferably between 32 $cm^3/(10\ min)$ and 75 $cm^3/(10\ min)$.

For good mechanical stability, the notched impact resistance of the thermoplastic compositions, measured to ISO 179/1eA:2010 at room temperature using test specimens of thickness 3 mm, is preferably at least 40 $kJ/m^2$, further preferably between 50 $kJ/m^2$ and 130 $kJ/m^2$, even further preferably between 55 $kJ/m^2$ and 120 $kJ/m^2$ and especially preferably between 55 $kJ/m^2$ and 80 $kJ/m^2$.

The collective thickness of the layers, carrier layer a1, stone layer a2 and transparent layer a3, of the multilayer body of the lighting unit of the invention is preferably 1.5 to 12 mm, further preferably 3 to 10 mm, even further preferably 4 to 8 mm.

It is preferable that the transparent layer covers the stone layer very substantially over the full area, especially to an extent of at least 90%.

An LED lighting unit preferred in accordance with the invention comprises
a) a multilayer body and
b) a first LED light source, wherein the multilayer body comprises the following layers in this sequence:
a1) a carrier layer of a translucent black or translucent gray thermoplastic composition, where the thermoplastic composition is based on aromatic polycarbonate,
a2) a stone layer having an average thickness over the total area of the stone layer of ≤2 mm,
a3) a transparent layer of a thermoplastic composition, based on aromatic polycarbonate, having an average thickness over the total area of 1 to 6 mm, on the face of the stone layer a2 that constitutes the visible face of the multilayer body in the LED lighting unit, and
wherein the first LED light source is disposed at at least one lateral edge of the transparent layer a3 such that the transparent layer a3 is utilizable as for light emitted by the LED light source and wherein
the composition of the carrier layer contains
a) at least 90% by weight, most preferably 95% by weight, of aromatic polycarbonate,
b) a colorant mixture of colorants other than component c and e, comprising at least two colorants, preferably selected from the group consisting of colorants based on anthraquinone, anthrapyridone, perinone, methine or quinoline, where further preferably one colorant is an anthraquinone-based colorant and the other colorant is likewise an anthraquinone-based colorant or an anthrapyridone-based colorant, especially a mixture of the colorants of the structures (15) and (11) or (15) and (17), in a total amount of up to 0.1% by weight of colorants of component b),
c) 0.0003% to 0.020% by weight, especially 0.0004% to 0.0015% by weight, of carbon black, especially nanoscale carbon black, more preferably as the sole carbon black,
d) 0.05% to 1.0% by weight, especially to 0.50% by weight, of at least one scattering additive from the group consisting of acrylate-based scattering additives and/or silicone-based scattering additives, where a silsesquioxane is preferably present as a scattering additive, which is most preferably the sole scattering additive of component d),
e) optionally up to 1.0% by weight, preferably 0.03% to 1.0% by weight, of at least one white pigment, preferably comprising a white pigment from the group consisting of titanium dioxide and/or barium sulfate, especially 0.04% 0.08% by weight of titanium dioxide, exceptionally preferably as the sole white pigment,
f) optionally one or more further additives, preferably selected from the group consisting of demolding agents, antioxidants, flame retardants, anti-dripping agents, thermal stabilizers, optical brighteners, UV absorbers, flow improvers, opacifiers other than component d, antistats and/or IR absorbers.

An LED lighting unit further preferred in accordance with the invention comprises
a) a multilayer body and
b) a first LED light source,
c) preferably a second LED light source,
wherein the multilayer body comprises the following layers in this sequence:
a1) a carrier layer of a translucent black or translucent gray thermoplastic composition having an average thickness over the total area of the carrier layer of 0.5 to 6 mm,
a2) a transparent stone layer, preferably selected from the group of colored slate, mica shale, limestone, sandstone or marble, having a thickness of ≤2 mm, preferably ≤1 mm,
a3) a transparent layer of a thermoplastic composition, where the thermoplastic composition contains at least 50% by weight, further preferably at least 75% by weight, even further preferably at least 90% by weight, of aromatic polycarbonate, having an average thickness over the total area of 1 to 6 mm, on the face of the stone layer a2 that constitutes the visible face of the multilayer body in the LED lighting unit, and
wherein the first LED light source is disposed at at least one lateral edge of the transparent layer a3 such that the transparent layer a3 is utilizable as for light emitted by the LED light source and
any second LED light source present is arranged such that it backlights the multilayer body (backlighting) and wherein
the composition of the carrier layer contains
a) at least 90% by weight, more preferably at least 95% by weight, most preferably up to 99.95% by weight, of aromatic polycarbonate,
b) a colorant mixture of colorants other than component c and component e, comprising at least two colorants, at least one colorant being an anthraquinone-based colorant and the other colorant an anthrapyridone-based colorant, where the total amount of colorants of component b) is up to 0.1% by weight,
c) 0.002% to 0.020% by weight of carbon black, where the carbon black present is especially nanoscale carbon black, very exceptionally preferably a nanoscale coloring carbon black, exceptionally preferably as the sole carbon black.
d) 0.05% to 1.0% by weight, especially to 0.5% by weight, of at least one scattering additive from the group consisting of acrylate-based scattering additives and/or silicone-based scattering additives,
f) optionally one or more further additives, selected from the group consisting of demolding agents, antioxidants, flame retardants, anti-dripping agents, thermal stabilizers, UV absorbers, flow improvers, opacifiers other than component d, antistats and/or IR absorbers,
and is more preferably free of white pigment.

An LED lighting unit even further preferred in accordance with the invention comprises
a) a multilayer body and
b) a first LED light source,
c) preferably a second LED light source, wherein the multilayer body comprises the following layers in this sequence:
a1) a carrier layer of a translucent black thermoplastic composition having an average thickness over the total area of the carrier layer of 0.5 to 6 mm,
a2) a stone layer, preferably selected from the group of colored slate, mica shale, limestone, sandstone or marble, having an average thickness over the total area of the stone layer of ≤2 mm, preferably ≤1 mm,
a3) a transparent layer of a thermoplastic composition, where the thermoplastic composition contains at least 50% by weight, further preferably at least 75% by weight, even further preferably at least 90% by weight, of aromatic polycarbonate, having an average thickness over the total area of 1 to 6 mm, on the face of the stone layer a2 that constitutes the visible face of the multilayer body in the LED lighting unit, and
wherein the first LED light source is disposed at at least one lateral edge of the transparent layer a3 such that the transparent layer a3 is utilizable as for light emitted by the LED light source and any second LED light source present is arranged such that it backlights the multilayer body and wherein the composition of the carrier layer contains a) at least 90% by weight, more preferably at least 95% by weight, most preferably up to 99.95% by weight, of aromatic polycarbonate, b) a colorant mixture of colorants other than component c and component e, comprising at least two colorants, at least one colorant being an anthraquinone-based colorant and the other colorant an anthrapyridone-based colorant, where the total amount of colorants of component b) is up to 0.1% by weight, c) 0.002% to 0.02% by weight of carbon black, where the carbon black present is especially nanoscale carbon black, very exceptionally preferably a nanoscale coloring carbon black, exceptionally preferably as the sole carbon black.

d) 0.05% to 1.0% by weight, especially to 0.50% by weight, of at least one scattering additive from the group consisting of acrylate-based scattering additives and/or silicone-based scattering additives, where a silsesquioxane is preferably present as a scattering additive, which is most preferably the sole scattering additive of component d), f) optionally one or more further additives, selected from the group consisting of demolding agents, antioxidants, flame retardants, anti-dripping agents, thermal stabilizers, UV absorbers, flow improvers, opacifiers other than component d, antistats and/or IR absorbers, and is more preferably free of white pigment.

More preferably, the translucent thermoplastic compositions of the carrier layer do not contain any further components, where group f of the further additives consists of the group of demolding agents, antioxidants, flame retardants, UV absorbers, flow improvers, opacifiers other than component d, antistats, IR absorbers, anti-dripping agents, optical brighteners and/or thermal stabilizers.

Most preferably, the multilayer body does not comprise any further layers apart from layers a1 to a3 and any protective layers present, especially transparent scratch-resistant layers.

Molding compounds for the layers and ultimately the layers of the multilayer body composed of thermoplastic compositions are produced proceeding from the components described by standard methods of incorporation, by combining, mixing and homogenizing, with the homogenization in particular preferably taking place in the melt by application of shear forces. To this end, the aromatic polycarbonate and any further components of the polycarbonate molding compound are mixed, extruded and pelletized in the melt under customary conditions in customary melt mixing assemblies, for example in single-screw or multi-screw extruders or in kneaders. The additives may be metered in either separately as granules/pellets via metering balances or side feed devices or else metered in at a suitable location into the solids conveying region of the extruder or into the polymer melt at elevated temperature as a melt by means of metering pumps. The masterbatches in the form of granules or pellets may also be combined with other particulate compounds to afford a premixture and then supplied together into the solids conveying region of the extruder or into the polymer melt in the extruder via metering hoppers or side feed devices. The compounding assembly is, for example, a twin-screw extruder, more preferably a twin-screw extruder having corotating screws, where the twin-screw extruder preferably has a screw length/diameter ratio of 20 to 44, more preferably of 28 to 40. Such a twin-screw extruder comprises a melting zone and a mixing zone or a combined melting and mixing zone and optionally a degassing zone where an absolute pressure p of preferably not more than 800 mbar, more preferably not more than 500 mbar, more preferably not more than 200 mbar, is established. The average residence time of the mixture composition in the extruder is preferably limited to not more than 120 seconds, more preferably not more than 80 seconds, more preferably not more than 60 seconds. In a preferred embodiment, the temperature of the melt of the polymer/of the polymer alloy at the extruder outlet is 200° C. to 400° C.

After the molding compounds have been produced, these may be converted to corresponding moldings by extrusion, hot pressing, injection-compression molding or injection molding.

For the production of the moldings of the invention, preference is given here to injection molding or injection-compression molding, especially injection molding. This involves inserting a stone plaque into an injection mold in a first step, and overmolding it with a molding compound. After demolding and a further cooling period, the molding compound that has solidified to give a thermoplastic molding is pulled away from the stone plaque, leaving a thin stone layer on the molding. This molding with the thin stone layer is reinserted into an injection mold in the second step, and the stone layer face is overmolded with a further molding compound. After the cooling time has elapsed, the finished multilayer body is demolded.

Injection molding methods are well known to those skilled in the art and are described, for example, in "Handbuch Spritzgießen" [Injection Molding Handbook], Friedrich Johannnaber/Walter Michaeli, Munich; Vienna: Hanser, 2001, ISBN 3-446-15632-1 or in "Anleitung zum Bau von Spritzgießwerkzeugen" [Introduction to the Construction of Injection Molds], Menges/Michaeli/Mohren, Munich; Vienna: Hanser, 1999, ISBN 3-446-21258-2.

Injection molding here includes all injection molding processes including multicomponent injection molding and injection-compression molding processes.

Injection-compression molding processes differ from conventional injection molding processes in that the injection and/or solidification procedure involves mold plate movement. In the known injection-compression molding process, the mold plates are already opened slightly before the injection procedure to compensate for the shrinkage occurring during subsequent solidification and to reduce the required injection pressure. A pre-enlarged cavity is therefore already present at the beginning of the injection procedure. Flash faces of the mold ensure that the pre-enlarged cavity is still sufficiently leakproof even when the mold plates have been somewhat opened. The plastics material is injected into this pre-enlarged cavity and is simultaneously/subsequently compressed as the mold moves towards the closed position. Particularly in the production of high-surface area and thin-walled moldings having long flow paths, the more complex injection-compression molding technique is preferred or in some cases essential. A reduction of the injection pressures required for large moldings is achieved only in this way. Furthermore, stresses/warpage in the injection molded part arising from high injection pressures can be avoided by injection-compression molding.

The multilayer bodies may either be in the form of sheets or have a three-dimensional surface, i.e. a shape other than that of a sheet, a sheet being understood to mean a body in which the three pairs of opposite sides of the faces a1, a2 and a3—with respect to one another and all collectively—are plane-parallel or at least nearly plane-parallel to one another.

As described above, the multilayer bodies may have, on one or both of the outer two-dimensional faces, a scratch-resistant lacquer as part of a protective layer or as protective layer. This is preferably a polysiloxane lacquer produced by the sol-gel process. The protective layer particularly preferably also contains at least one UV absorber. The protective layer has a high abrasion and scratch resistance and thus fulfils in particular the function of a scratch-resistant coating.

Commercially available systems are, for example, AS4000, SHC5020 and AS4700 from Momentive Performance Materials. Such systems are described for example in U.S. Pat. No. 5,041,313 A, DE 3,1213,85 A1, U.S. Pat. No. 5,391,795 A and WO 2008/109072 A1. These materials are typically synthesized via condensation of alkoxy- and/or alkylalkoxysilanes under acid or base catalysis. Nanoparticles can optionally be incorporated. Preferred solvents are alcohols such as butanol, isopropanol, methanol, ethanol and mixtures of these.

Various methods for applying a scratch-resistant coating to plastics articles are known. The scratch-resistant coatings may be applied, for example, via dipping methods, spin-coating, spraying methods or flow-coating, preferably via dipping or flow methods. Curing can be effected thermally or by UV irradiation. The scratch-resistant coating can by way of example be applied directly or after use of a primer for preparation of the substrate surface. A scratch-resistant coating may also be applied via plasma-assisted polymerization methods, for example via an $SiO_2$ plasma. Antifogging or antireflection coatings may likewise be produced via plasma methods. It is additionally possible to use certain injection molding processes, for example overmolding of surface-treated films, to apply a scratch-resistant coating on the resulting molded article. The scratch-resistant layer may include various additives, for example UV absorbers, derived from triazoles or from triazines, for example.

The protective layer may be single- or multilayer systems and hence also a combination of two or more layers. More particularly, the protective layer may consist of the layers topcoat layer a' and primer layer a", with the primer layer arranged between the topcoat layer and the layer to be protected.

Polysiloxane-based scratch-resistant coatings are preferably applied via dipping or flow methods. Curing is effected at temperatures of 50° C.-140° C.

Preference is given to using a UV absorber-containing primer in order to improve the adhesion of the scratch-resistant lacquer on the layer to be protected. The primer may comprise further stabilizers, for example HALS systems (stabilizers based on sterically hindered amines), adhesion promoters and/or flow enhancers. The respective resin forming the base material of the primer layer may be selected from a multiplicity of materials and is described for example in Ullmann's Encyclopedia of Industrial Chemistry, 5th Edition, Vol. A18, pp. 368-426, VCH, Weinheim 1991. It is possible to use polyacrylates, polyurethanes, phenol-based systems, melamine-based systems, epoxy systems and alkyd systems, and mixtures of these systems. The resin is usually dissolved in suitable solvents-often in alcohols. Depending on the resin chosen, hardening can be effected at room temperature or at elevated temperatures.

Preference is given to using temperatures between 50° C. and 140° C.—often after a large part of the solvent has been removed over a short period at room temperature. Examples of commercially available primer systems include SHP470, SHP470-FT2050 and SHP401 from Momentive Performance Materials. Such coatings are described, for example, in U.S. Pat. No. 6,350,512 B1, U.S. Pat. No. 5,869,185 A, EP 1308084 A1 and WO 2006/108520 A1.

In a preferred embodiment which achieves particularly good weathering stability, the protective layer comprises
  a polysiloxane-based scratch-resistant coating comprising
    i. at least one UV absorber from the group of benzophenones, resorcinols, 2-(2-hydroxyphenyl)benzotriazoles, hydroxyphenyl-s-triazines, 2-cyanoacrylates, oxalanilides
      and/or a UV inhibitor from the group of sterically hindered amines (HALS), in particular based on 2,2,6,6-tetramethylpiperidine or derivatives thereof;
    ii. at least one combination of an organomodified silane with a silica sol.
      The organomodified silane is, for example, a methyltrialkoxy- or dimethyldialkoxysilane;

and optionally, in a further-preferred embodiment, additionally a primer layer (layer a") which is disposed atop the layer to be coated and acts as an adhesion promoter between the polysiloxane-based scratch-resistant coating and the layer to be coated, comprising at least one UV absorber from the group of the benzophenones, the resorcinols, 2-(2-hydroxyphenyl)benzotriazoles, hydroxyphenyl-s-triazines, 2-cyanoacrylates, oxalanilides and/or sterically hindered amines (HALS), especially based on 2,2,6,6-tetramethylpiperidine and derivatives thereof, where the thickness of the primer layer is 0.3 µm to 8 µm, preferably 1.1 µm to 4.0 µm.

Most preferably, the protective layer does not comprise any further layers.

According to the invention, "derivatives" are understood to mean those compounds having a molecular structure that has, in place of a hydrogen atom or a functional group, a different atom or a different group of atoms or in which one or more atoms/groups of atoms has/have been removed. The parent compound is thus still recognizable.

The polysiloxane layer preferably comprises silicon compounds of the formula $R_n SiX_{4-n}$ and/or partial condensates thereof, where the R radicals are the same or different and are a linear or branched, saturated or mono- or polyunsaturated or aromatic hydrocarbyl radical, the X radicals are the same or different and are hydrolysable groups or hydroxyl groups, preferably halogen, especially chlorine or bromine, alkoxy groups, alkylcarbonyl groups or acyloxy groups, and n is 0, 1, 2 or 3, preferably 1 or 2, most preferably 1. R preferably represents saturated, branched or unbranched alkyl radicals having 1 to 20 carbon atoms and/or represents mono- or polyunsaturated branched or unbranched alkenyl radicals having 2 to 20 carbon atoms or aromatic groups having 6 to 12 carbons. The alkyl/alkenyl radicals further preferably have up to 12, still further preferably up to 8, carbon atoms. More preferably, all radicals are methyl and/or phenyl. More preferably, X is an alkoxy group, most preferably a $C_1$- to $C_4$-alkoxy group, for example a methoxy group or an ethoxy group.

The silicon compounds $R_n SiX_{4-n}$ are hydrolyzable and condensable via the X radicals. These hydrolytically condensable groups are used to construct an inorganic network comprising Si-0-Si units. In contrast to the X radicals, the R radicals are stable to hydrolysis under the typical condensation conditions.

When using the abovementioned siloxane systems, dry layer thicknesses of 3 μm-20 μm are preferred, further preferably 5 μm-15 μm, especially preferably 6 μm-12 μm. "Dry layer thickness" here means the layer thickness of the lacquer after application and subsequent evaporation of the solvent and subsequent thermal or UV curing.

Rather than primer/scratch resistant coating combinations, it is also possible to use one-component hybrid systems that are either thermally curable or UV-curable for the multilayer articles of the invention.

These are described, for example, in EP 0570165 A2 or WO 2008/071363 A2 or DE 2804283 A. Commercially available hybrid systems are obtainable, for example, under the PHC 587, PHC 587C names as thermally curable lacquers and under the UVHC 3000 and UVHC 5000 names as UV-curable lacquers from Momentive Performance Materials.

Further commercially available UV-curing lacquer systems that are suitable in accordance with the invention are UVT 610 and UVT 820 from Redspot.

In a particularly preferred process for producing the moldings of the invention, the protective layer is applied by means of the flow-coating process since it results in coated parts having a high optical quality.

The flow-coating process can be effected manually with a hose or suitable coating head or automatically in a continuous procedure by way of flow-coating robots and optionally slot dies.

Further possible methods of application are dipping, blade coating, rolling, spraying or spin-coating. The components may be coated here either while suspended or while mounted in an appropriate holder.

For larger and/or 3D components—i.e. components having a three-dimensional surface which thus have a geometry departing from that of a sheet- the component to be coated is suspended or mounted in a suitable holder.

In the case of small-scale components, the coating procedure can also be carried out manually. Here, the liquid primer or lacquer solution to be layered for formation of the protective layer is poured over the sheet in the longitudinal direction starting from the upper edge of the small part, while the starting point of the lacquer on the sheet is simultaneously passed from left to right over the sheet width. The coated sheets are aired and cured according to the respective manufacturer instructions while hanging vertically by a clamp.

The invention especially relates to the following embodiments:

1. An LED lighting unit comprising
   a) a multilayer body and
   b) a first LED light source,
   wherein the multilayer body comprises the following layers in this sequence:
     a1) a carrier layer of a translucent black or translucent gray thermoplastic composition,
     a2) a stone layer having an average thickness over the total area of the stone layer of ≤2 mm,
     a3) a transparent layer of a thermoplastic composition having an average thickness over the total area of 1 to 6 mm, on the face of the stone layer a2 that constitutes the visible face of the multilayer body in the LED lighting unit,
   wherein the first LED light source is disposed at at least one lateral edge of the transparent layer a3 such that the transparent layer a3 is utilizable as for light emitted by the LED light source.

2. The LED lighting unit according to embodiment 1, characterized in that the composition of the carrier layer a1 and/or the composition of the transparent layer a3 is/are based on aromatic polycarbonate.

3. The LED lighting unit according to either of the preceding embodiments, characterized in that the thickness of the carrier layer a1, averaged over the total area of the carrier layer, is 0.5 to 6 mm.

4. The LED lighting unit according to any of the preceding embodiments, characterized in that the multilayer body has a geometry other than that of a sheet.

5. The LED lighting unit according to any of the preceding embodiments, characterized in that the multilayer body does not have any further layers aside from the optional presence of protective layers.

6. The LED lighting unit according to any of the preceding embodiments, characterized in that average thickness of the stone layer over the total area of the stone layer a2 is ≤0.3 mm.

7. The LED lighting unit according to any of the preceding embodiments, characterized in that the stone layer a2, at least on the flat side facing the transparent layer a3, has a topography having maximum roughness Rz of preferably at least 0.1 μm, more preferably at least 0.5 μm, further preferably 0.5 to 10 000 μm, more preferably 1.0 to 5000 μm.

8. The LED lighting unit according to any of the preceding embodiments, characterized in that the transparent layer a3 covers the stone layer a2 over very substantially the full area, especially to an extent of at least 90%.

9. The LED lighting unit according to any of the preceding embodiments, characterized in that the carrier layer a1 covers the stone layer a2 over its full area or projects beyond it at at least one lateral edge.

10. The LED lighting unit according to any of the preceding embodiments, characterized in that the LED lighting unit has a second LED light source arranged in such a way that it backlights the multilayer body.

11. The LED lighting unit according to any of the preceding embodiments, characterized in that the second LED light source has one or more RGB LEDs.

12. The LED lighting unit according to any of the preceding embodiments, characterized in that the translucent thermoplastic composition of the carrier layer a1 contains
   a) at least 90% by weight of aromatic polycarbonate,
   b) a colorant mixture composed of colorants other than component c and component e, comprising at least two colorants
     in a total amount of up to 0.1% by weight of colorants of component b),
   c) 0.00001% by weight to 0.05% by weight of carbon black,
   d) 0.00001% to 2% by weight of at least one scattering additive from the group consisting of acrylate-based scattering additives and/or silicone-based scattering additives,
   e) optionally up to 1.0% by weight of at least one white pigment,
   f) optionally one or more further additives, preferably selected from the group consisting of demolding agents, antioxidants, flame retardants, anti-dripping agents, thermal stabilizers, optical brighteners, flow improvers, opacifiers other than component d, antistats, UV absorbers and/or IR absorbers.

13. The LED lighting unit according to any of embodiments 1 to 11, characterized in that the translucent thermoplastic composition of the carrier layer a1 consists of a) 95% by weight to 99.95% by weight of aromatic polycarbonate,
b) a colorant mixture composed of colorants other than component c and component e, comprising at least two colorants selected from the group consisting of colorants based on anthraquinone, anthrapyridone, perinone, methine and quinoline, in a total amount of 0.0005% by weight to 0.02% by weight,
c) 0.00001% by weight to 0.02% by weight of carbon black,
d) 0.00001% to 2% by weight of at least one scattering additive from the group consisting of acrylate-based scattering additives and/or silicone-based scattering additives,
e) optionally up to 1.0% by weight of at least one white pigment,
f) optionally one or more further additives, selected from the group consisting of demolding agents, antioxidants, flame retardants, UV absorbers, IR absorbers, flow improvers, opacifiers other than component d, antistats, anti-dripping agents, optical brighteners and/or thermal stabilizers.

14. The LED lighting unit according to any of embodiments 1 to 11, characterized in that the translucent thermoplastic composition of the carrier layer a1 contains
a) at least 90% by weight of aromatic polycarbonate,
b) a colorant mixture of colorants other than component c, comprising at least two colorants, at least one colorant being an anthraquinone-based colorant and the other colorant an anthrapyridone-based colorant, where the total amount of colorants of component b) is up to 0.1% by weight,
c) 0.002% by weight to 0.020% by weight of carbon black,
d) 0.05% to 1.0% by weight of at least one scattering additive from the group consisting of acrylate-based scattering additives and/or silicone-based scattering additives,
f) optionally one or more further additives, selected from the group consisting of demolding agents, antioxidants, flame retardants, anti-dripping agents, thermal stabilizers, flow improvers, opacifiers other than component d, antistats, UV absorbers and/or IR absorbers,
and
is free of white pigment.

15. The LED lighting unit according to any of embodiments 1 to 11, characterized in that the translucent thermoplastic composition of the carrier layer contains
a) at least 90% by weight of aromatic polycarbonate,
b) a colorant mixture composed of colorants other than component c and component e, comprising at least two colorants, the colorants being selected from the group consisting of colorants based on anthraquinone, anthrapyridone, perinone, methine and quinoline, where the total amount of colorants of component b) is up to 0.1% by weight,
c) 0.0003% by weight to 0.020% by weight of carbon black,
d) 0.05% to 1.0% by weight of at least one scattering additive from the group consisting of acrylate-based scattering additives and/or silicone-based scattering additives,
e) 0.03% to 1.0% by weight of at least one white pigment,
f) optionally one or more further additives, especially selected from the group consisting of demolding agents, antioxidants, flame retardants, anti-dripping agents, thermal stabilizers, optical brighteners, flow improvers, opacifiers other than component d, antistats, UV absorbers and/or IR absorbers.

16. The LED lighting unit according to any of embodiments 12 to 15, characterized in that the carbon black is nanoscale carbon black and the scattering additive present is at least one silsesquioxane.

17. The LED lighting unit according to any of the preceding embodiments, characterized in that the LED lighting unit is an element for formation of a floor covering, for furniture making, a wall panel, a door panel, part of a lamp, a lighting element, a housing of domestic appliances or electrical equipment, or an element of the automotive sector.

18. The LED lighting unit according to any of the preceding embodiments, characterized in that the LED lighting unit is an element from the automotive sector, specifically a lighting element, part of the interior trim, part of a dashboard, part of an instrument panel, a decorative strip, a doorsill strip, part of an armrest or part of a center console.

EXAMPLES

The invention is illustrated in detail by the examples which follow, but is not restricted thereto.
Materials Used
Transparent Makrolon® Ai from Covestro Deutschland AG: aromatic polycarbonate based on bisphenol A with an MVR of 19 cm$^3$/(10 min), determined at 300° C. and 1.2 kg to DIN ISO 1133:2012-03, containing UV absorber and demolding agent. Ty, measured at a thickness of 2 mm to ISO 13468-2:2006 (D65, 10°): 88.07%. Haze, determined to ASTM D1003:2013, at a layer thickness of 2 mm: 0.68%.
Translucent black-colored Makrolon® Ai from Covestro Deutschland AG: aromatic polycarbonate based on bisphenol A with an MVR of 19 cm$^3$/(10 min), determined at 300° C. and 1.2 kg to DIN ISO 1133:2012-03, containing UV absorber and demolding agent. Ty, measured at a thickness of 2 mm to ISO 13468-2:2006 (D65, 10°): 3.84%. Haze, determined to ASTM D1003:2013, at a layer thickness of 2 mm 100%.
For pretreatment, the polycarbonates were dried at 120° C. in dry air for 4 hours.
Stone plaques of colored slate, stone plaques of mica shale and stone plaques of sandstone each having a thickness of about 3 mm that were cut to the dimensions of 200 mm×150 mm.
Production of the Shaped Bodies
For each of the stone plaques, a multilayer molding having dimensions of 200 mm×150 mm×6 mm was produced on a KM GX400 injection molding machine from KraussMaffei Group GmbH.
For this purpose, in a first step, a stone plaque that had been preheated beforehand at 150° C. for 15 minutes in a heating cabinet was inserted into the first half of a steel mold having internal mold dimensions of 200 mm×150 mm×6 mm. After the mold had been closed, the transparent polycarbonate material in molten form at 305° C. was injected onto the stone surface in the mold at a maximum specific injection pressure of about 2000 bar. The temperature of the mold wall on the ejector side was 100° C., and on the opposite injection side 90° C. The injection time was 2.5 seconds. After a hold-pressure time of 15 seconds (specific hold pressure: 850 bar) and a cooling time of 35 seconds, the mold was opened and the molding was removed.
After this molding had been cooled at room temperature for about 5 minutes, the polycarbonate plaque injected onto the stone surface was pulled away from the stone plaque.

This left a very thin stone layer fixed to the polycarbonate plaque, which had a thickness averaged over the total area of <2 mm.

The polycarbonate plaque with the thin stone layer that has an average thickness of somewhat more than 3 mm was preheated again in a heated cabinet at 115° C. for 15 minutes. In parallel, the polycarbonate material in the injection barrel was switched from transparent to translucent black. Subsequently, this plaque was reinserted into the first half of the steel mold having internal mold dimensions of 200×150×6 mm, with the surface having the stone layer facing the second half of the mold. After the mold had been closed, the translucent black polycarbonate material in molten form at 305° C. was injected onto the transparent polycarbonate plaque with the stone surface in the mold at a maximum specific injection pressure of about 2000 bar. The temperature of the mold wall on the ejector side was 90° C., and on the opposite injection side 65° C. The injection time was 2.2 seconds. After a hold-pressure time of 15 seconds (specific hold pressure: 800 bar) and a cooling time of 30 seconds, the mold was opened and the finished molding with a total thickness of about 6 mm was removed.

For lighting of the shaped bodies, these were clamped in a lightbox manufactured to accommodate plaques having dimensions of 200 mm×150 mm. This lightbox has an LED strip for edge lighting that runs around the plaque, and an RGB LED printed circuit board for backlighting. Edge lighting and backlighting can be operated here either separately or in combination. This achieved the effects mentioned above in the description.

The invention claimed is:

1. A lighting unit comprising:
a multilayer body including:
a carrier layer of a black or gray colored translucent thermoplastic material,
a stone layer having an average thickness of ≤2 mm over its total area,
a transparent layer of a thermoplastic material and having an average thickness 1 mm to 6 mm over its total area; and
a first LED light source, arranged at least one lateral edge of the transparent layer, and configured to project light into the transparent layer, such that light is projected out of a surface of the transparent layer facing away from the stone layer.

2. The lighting unit as claimed in claim 1, wherein the material of at least one of the carrier layer or the transparent layer includes an aromatic polycarbonate.

3. The lighting unit as claimed in claim 1, wherein the carrier layer has an average thickness over its total area of 0.5 to 6 mm.

4. The LED lighting unit as claimed in claim 1, wherein the multilayer body has a planar rectangular shape.

5. The lighting unit as claimed in claim 1, further comprising at least one protective layers.

6. The lighting unit as claimed in claim 1, wherein the average thickness of the stone layer over its total area is ≤0.3 mm.

7. The LED lighting unit as claimed in claim 1, wherein the stone layer, includes a flat side facing the transparent layer, the flat side having a topography with a maximum roughness $R_z$ of at least 0.1 μm.

8. The lighting unit as claimed in claim 1, wherein the transparent layer covers at least 90% of the stone layer.

9. The lighting unit as claimed in claim 1, wherein the carrier layer extends at least over the full area of the stone layer.

10. The lighting unit as claimed in claim 1, further comprising a second LED light source arranged to backlight the multilayer body.

11. The lighting unit as claimed in claim 1, wherein the second LED light source comprises one or more RGB LEDs.

12. The lighting unit as claimed in claim 1, wherein the translucent thermoplastic material of the carrier layer comprises
a) 95% by weight to 99.95% by weight of aromatic polycarbonate,
b) 0.00001% by weight to 0.02% by weight of carbon black,
c) 0.00001% to 2% by weight of at least one scattering additive selected from the group consisting of acrylate-based scattering additives and silicone-based scattering additives,
d) up to 1.0% by weight of at least one white pigment,
e) at least one further additive, selected from the group consisting of demolding agents, antioxidants, flame retardants, UV absorbers, IR absorbers, flow improvers, opacifiers other than component c, antistats, anti-dripping agents, optical brighteners, and thermal stabilizers
f) a colorant mixture comprising a total amount of 0.0005% by weight to 0.02% by weight, of at least two colorants, other than component b and component d, selected from the group consisting of colorants based on anthraquinone, anthrapyridone, perinone, methine and quinoline.

13. The lighting unit as claimed in claim 1, wherein the translucent thermoplastic material of the carrier layer is free of white pigment and contains
a) at least 90% by weight of aromatic polycarbonate,
b) 0.002% to 0.020% by weight of carbon black,
c) 0.05% to 1.0% by weight of at least one scattering additive selected from the group consisting of acrylate-based scattering additives and silicone-based scattering additives,
d) at least one further additive, selected from the group consisting of demolding agents, antioxidants, flame retardants, anti-dripping agents, thermal stabilizers, flow improvers, opacifiers other than component d, antistats, UV absorbers, and IR absorbers,
e) a colorant mixture of colorants comprising a total amount of up to 0.1% by weight, of at least two colorants, other than component b, comprising at least one anthraquinone-based colorant and an anthrapyridone-based colorant.

14. The lighting unit as claimed in claim 1, wherein the translucent thermoplastic material of the carrier layer contains
a) at least 90% by weight of aromatic polycarbonate,
b) 0.0003% by weight to 0.020% by weight of carbon black,
c) 0.05% to 1.0% by weight of at least one scattering additive selected from the group consisting of acrylate-based scattering additives and silicone-based scattering additives,
d) 0.03% to 1.0% by weight of at least one white pigment,
e) at least one further additive selected from the group consisting of demolding agents, antioxidants, flame retardants, anti-dripping agents, thermal stabilizers, optical brighteners, flow improvers, opacifiers other than component d, antistats, UV absorbers, and IR absorbers,
f) a colorant mixture comprising a total amount of up to 0.1% by weight, of at least two colorants other than component b and component d, the colorants being selected from the group consisting of colorants based on anthraquinone, anthrapyridone, perinone, methine, and quinoline.

15. The LED lighting unit as claimed in claim 1, in combination with of one selected from the group consisting of a floor covering, for furniture making, a wall panel, a door panel, part of a lamp, a lighting element, a housing of domestic appliances, electrical equipment, and a vehicle element.

16. The lighting unit as claimed in claim 1, in combination with a vehicle element selected from the group consisting of a lighting element, a part of interior trim, a part of a dashboard, a part of an instrument panel, a decorative strip, a doorsill strip, a part of an armrest and a part of a center console.

17. The lighting unit as claimed in claim 1, wherein the translucent thermoplastic material of the carrier layer contains:

a) at least 90% by weight of aromatic polycarbonate,
b) 0.00001% by weight to 0.05% by weight of carbon black,
c) 0.00001% to 2% by weight of at least one scattering additive selected from the group consisting of acrylate-based scattering additives and silicone-based scattering additives,
d) up to 1.0% by weight of at least one white pigment,
e) at least one further additives, selected from the group consisting of demolding agents, antioxidants, flame retardants, anti-dripping agents, thermal stabilizers, optical brighteners, flow improvers, opacifiers other than component c, antistats, UV absorbers, and IR absorbers,
f) a colorant mixture comprising a total amount of up to 0.1% by weight of at least two colorants, other than component b and component d.

18. The LED lighting unit as claimed in claim 17, wherein the carbon black is nanoscale carbon black, and the scattering additive present comprises at least one silsesquioxane.

* * * * *

UNITED STATES PATENT AND TRADEMARK OFFICE
CERTIFICATE OF CORRECTION

PATENT NO. : 12,122,140 B2
APPLICATION NO. : 17/642999
DATED : October 22, 2024
INVENTOR(S) : Torsten Thust et al.

Page 1 of 1

It is certified that error appears in the above-identified patent and that said Letters Patent is hereby corrected as shown below:

In the Claims

Column 35, Line 52 and Line 59, please remove the text "LED".

Column 37, Line 5, please remove the text "LED".

Column 38, Line 17, please remove the text "LED".

Signed and Sealed this
Eleventh Day of March, 2025

Coke Morgan Stewart
*Acting Director of the United States Patent and Trademark Office*